(12) United States Patent
Matte

(10) Patent No.: US 9,216,823 B2
(45) Date of Patent: Dec. 22, 2015

(54) WING FLAPPING MECHANISM AND METHOD

(71) Applicant: Francois Matte, Quebec (CA)

(72) Inventor: Francois Matte, Quebec (CA)

(*) Notice: Subject to any disclaimer, the term of this patent is extended or adjusted under 35 U.S.C. 154(b) by 136 days.

(21) Appl. No.: 14/216,381

(22) Filed: Mar. 17, 2014

(65) Prior Publication Data
US 2014/0263826 A1 Sep. 18, 2014

Related U.S. Application Data

(60) Provisional application No. 61/793,335, filed on Mar. 15, 2013.

(51) Int. Cl.
*B64C 33/02* (2006.01)
*A63H 27/00* (2006.01)

(52) U.S. Cl.
CPC .............. *B64C 33/02* (2013.01); *A63H 27/008* (2013.01); *B64C 2201/025* (2013.01)

(58) Field of Classification Search
CPC B64C 33/02; B64C 33/025; B64C 2201/025; A63H 27/008
See application file for complete search history.

(56) References Cited

U.S. PATENT DOCUMENTS

| | | | |
|---|---|---|---|
| 1,068,652 A | 7/1913 | Hartley | |
| 1,450,480 A | 4/1923 | Buck | |
| 1,783,029 A | 11/1930 | White | |
| 2,112,107 A | 3/1938 | Lutschg | |
| 3,153,523 A | 10/1964 | Lowman, III | |
| 3,626,555 A * | 12/1971 | Albertini et al. | A63H 29/18 446/35 |
| 5,163,861 A | 11/1992 | Van Ruymbeke | |
| 5,288,039 A | 2/1994 | DeLaurier et al. | |
| 5,681,014 A | 10/1997 | Palmer | |
| 6,082,671 A | 7/2000 | Michelson | |
| 6,206,324 B1 | 3/2001 | Smith | |
| 7,607,610 B1 | 10/2009 | Sterchak | |
| 7,651,051 B2 | 1/2010 | Agrawal et al. | |
| 7,963,478 B2 | 6/2011 | Kim et al. | |
| 8,033,499 B2 * | 10/2011 | Yang | A63H 27/008 244/22 |
| 2002/0117583 A1 | 8/2002 | Hamamoto et al. | |
| 2002/0173217 A1 * | 11/2002 | Kinkade | B64C 33/02 446/35 |
| 2009/0179108 A1 * | 7/2009 | Yang | A63H 27/008 244/72 |
| 2012/0003896 A1 | 1/2012 | Van Ruymbeke | |

FOREIGN PATENT DOCUMENTS

| | | |
|---|---|---|
| BG | 31541 A1 | 2/1982 |
| BG | 34811 A1 | 12/1983 |
| CN | 101049859 A | 10/2007 |

(Continued)

*Primary Examiner* — Philip J Bonzell
(74) *Attorney, Agent, or Firm* — Ipaxio S.E.N.C.

(57) ABSTRACT

The wing flapping mechanism (100) includes a main frame (110), a pair of opposite wings (120) laterally projecting from the main frame (110), and a linkage arrangement to convert rotation of a motor (150) into a three-dimensional cyclic wing motion of each of the wings (120). The linkage arrangement includes torque-transmitting couplings extending from inside the main frame (110) into the wing structures (122) to transmit an alternating pivoting motion, created as a result of the rotation of the motor (150), to the distal end of a corresponding third torsion-responsive tube (140, 144'''). Each torque-transmitting coupling extends inside a shoulder joint (130), a first torsion-responsive tube (132, 144'), an elbow joint (134), a second torsion-responsive tube (136, 144''), a wrist joint (138) and the third torsion-responsive tube (140, 144''') of the corresponding wing structure (122).

22 Claims, 26 Drawing Sheets

(56) References Cited

FOREIGN PATENT DOCUMENTS

| | | |
|---|---|---|
| CN | 201941975 | 8/2011 |
| DE | 4125974 A1 | 2/1993 |
| DE | 202006010198 U1 | 11/2006 |
| DE | 102009015974 A1 | 9/2010 |
| DE | 202011005401 U1 | 6/2011 |
| FR | 726832 A | 6/1932 |
| FR | 757429 A | 12/1933 |
| FR | 2697442 B1 | 12/1994 |
| FR | 2776937 A1 | 10/1999 |
| FR | 2875213 B1 | 1/2008 |
| FR | 2893913 B1 | 12/2008 |
| GB | 289829 A | 10/1928 |
| GB | 1318342 A | 5/1973 |
| GB | 2368829 B | 5/2002 |
| JP | 4681062 B2 | 5/2011 |
| RU | 2157328 C1 | 10/2000 |
| RU | 2350509 C2 | 3/2009 |
| RU | 2392189 C1 | 6/2010 |
| WO | 2007026701 A1 | 3/2007 |
| WO | 2008125868 A2 | 10/2008 |
| WO | 2012123074 A1 | 9/2012 |

\* cited by examiner

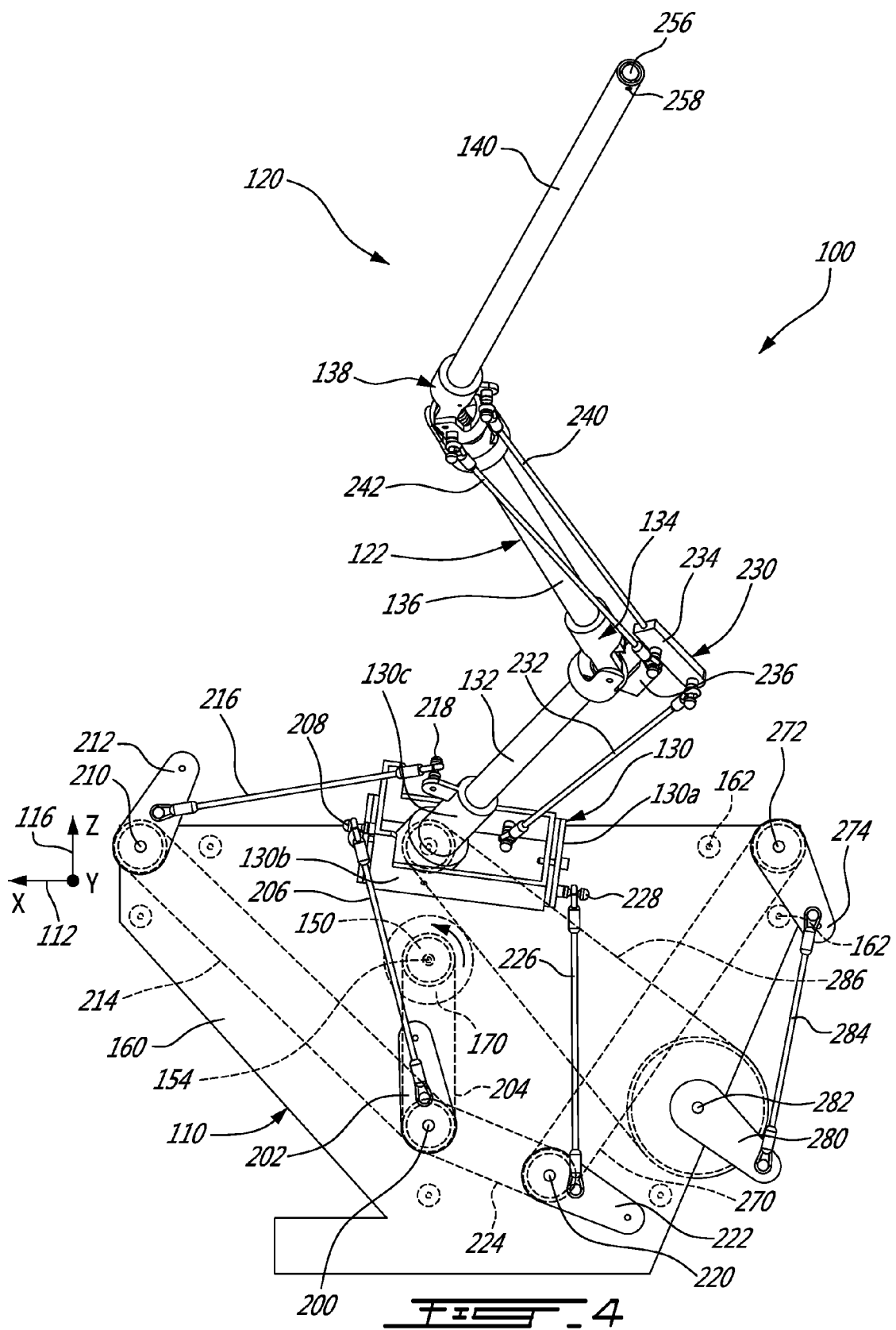

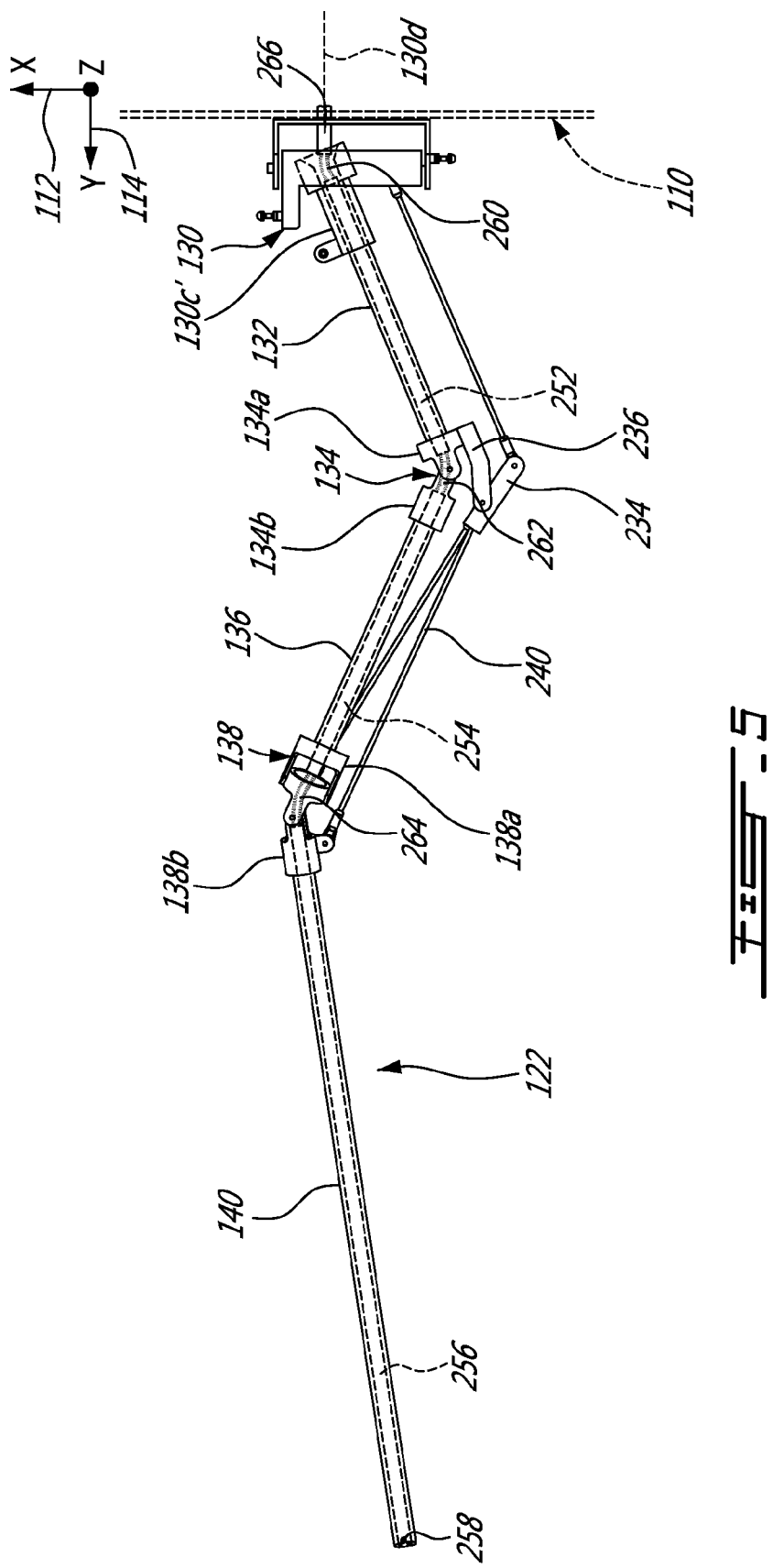

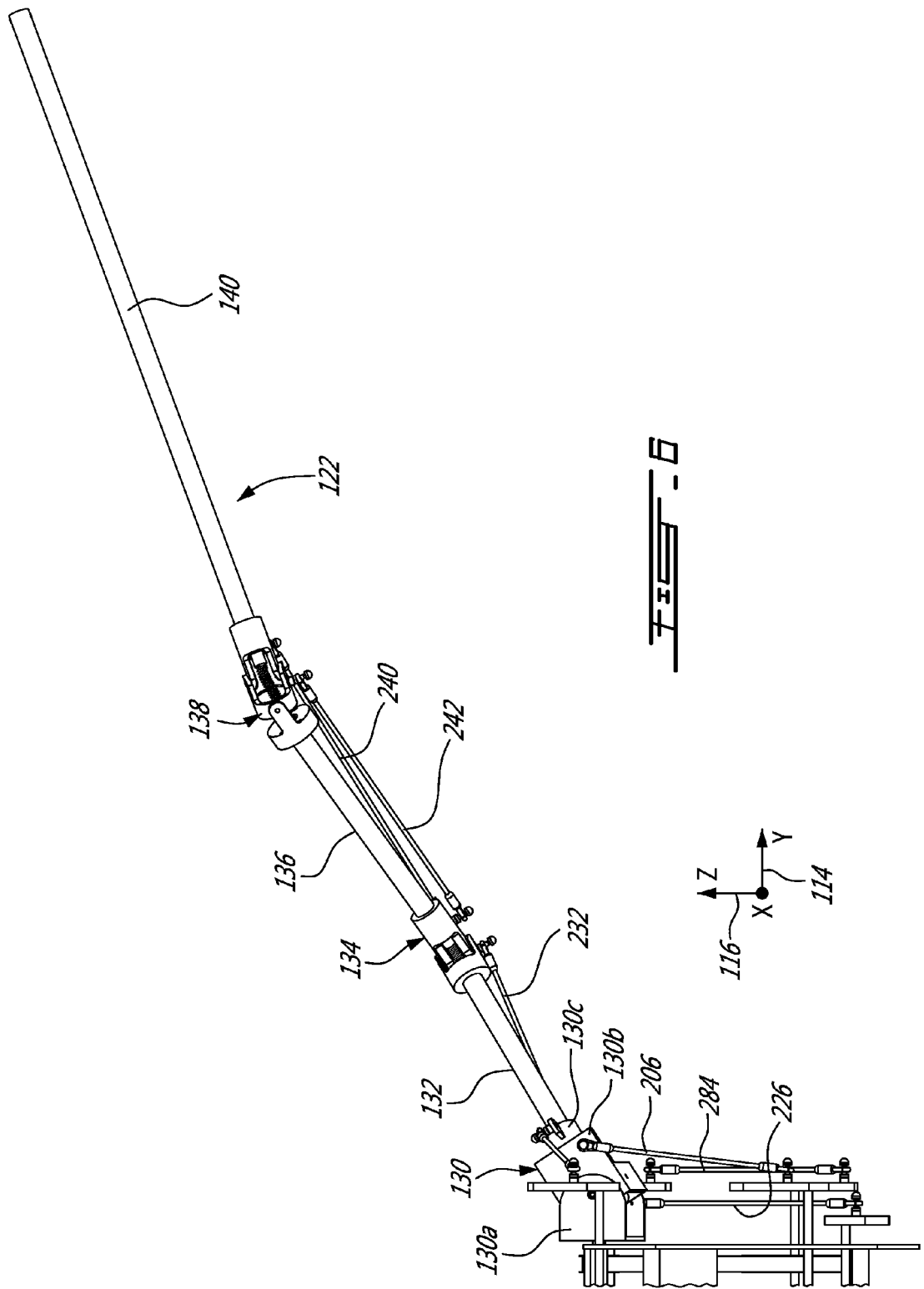

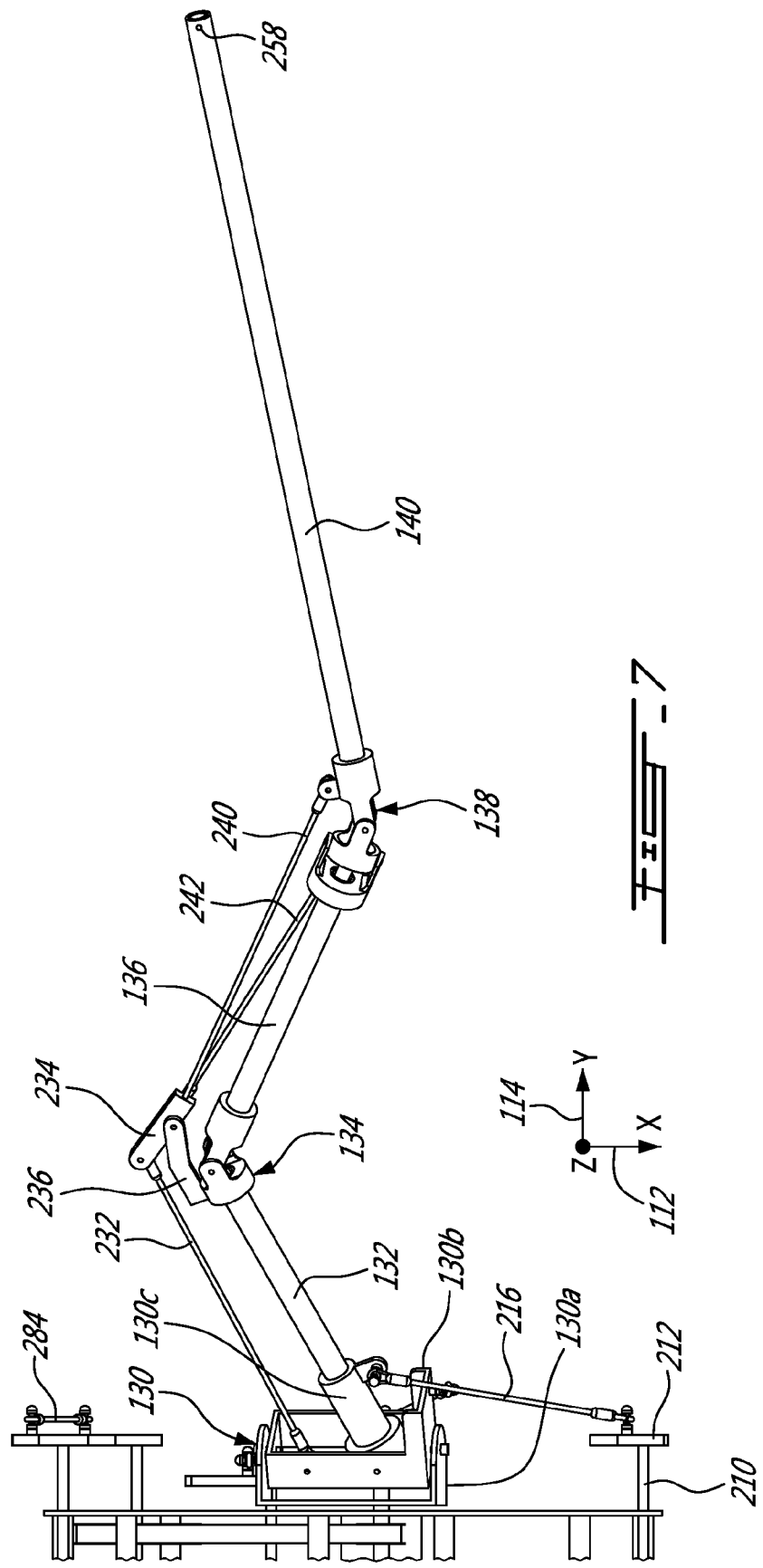

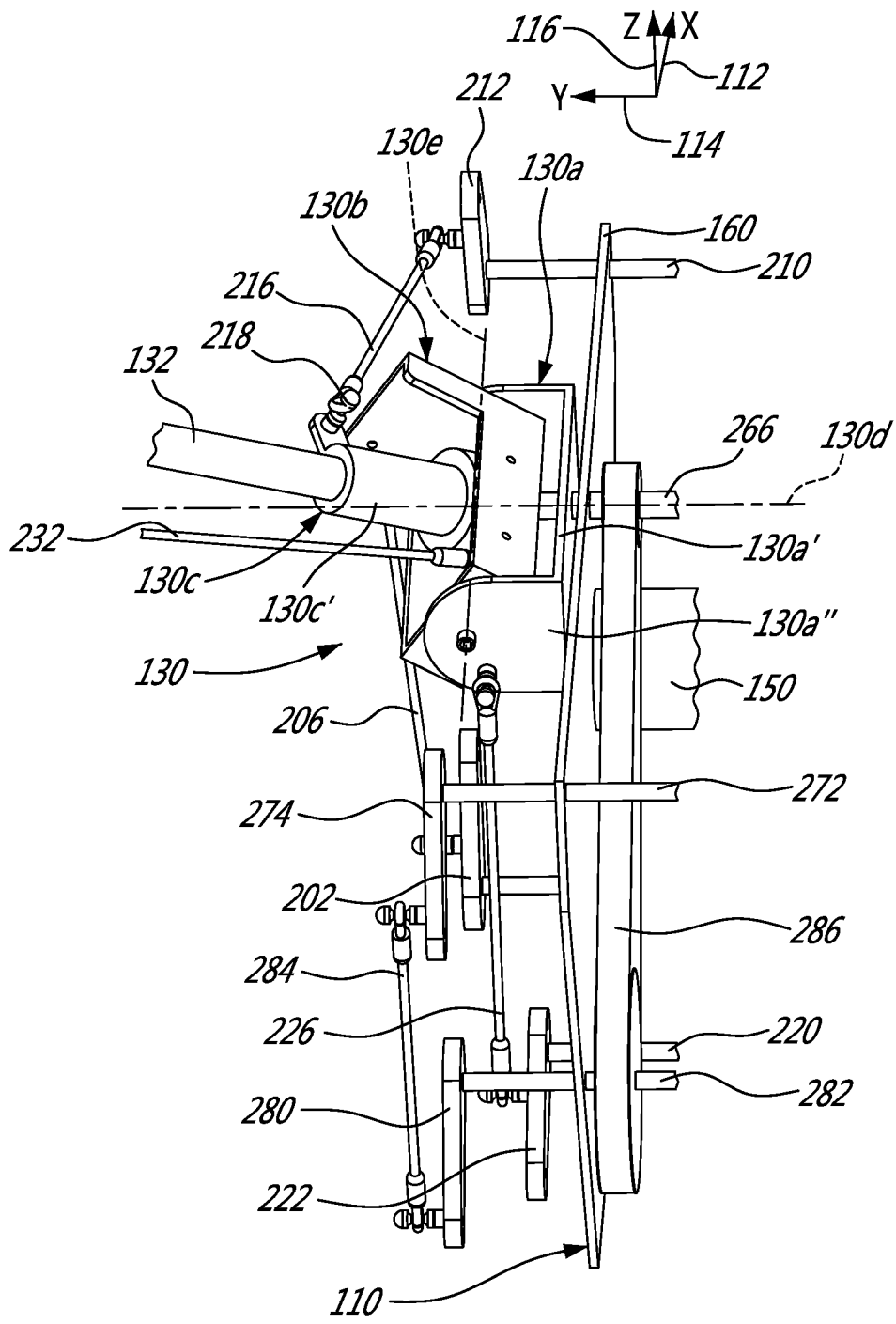

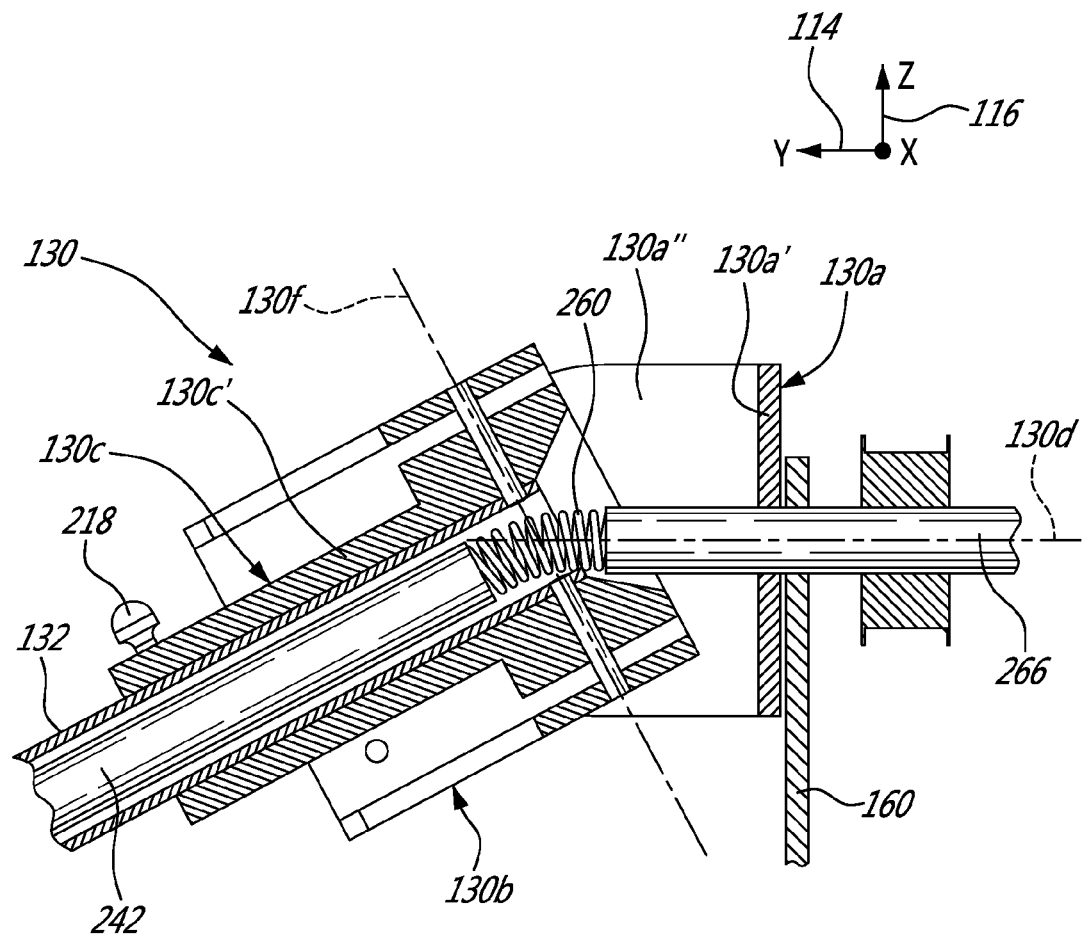

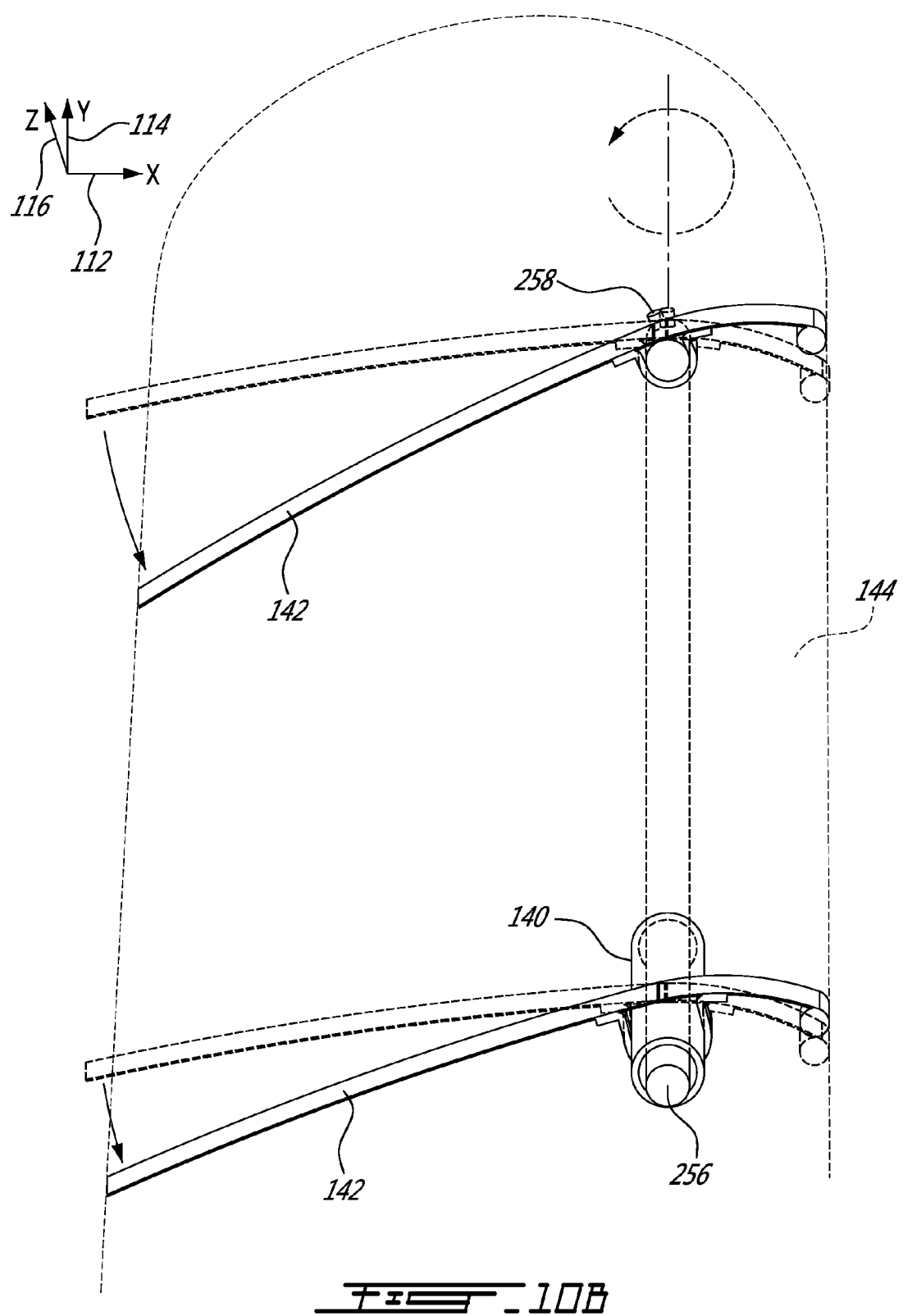

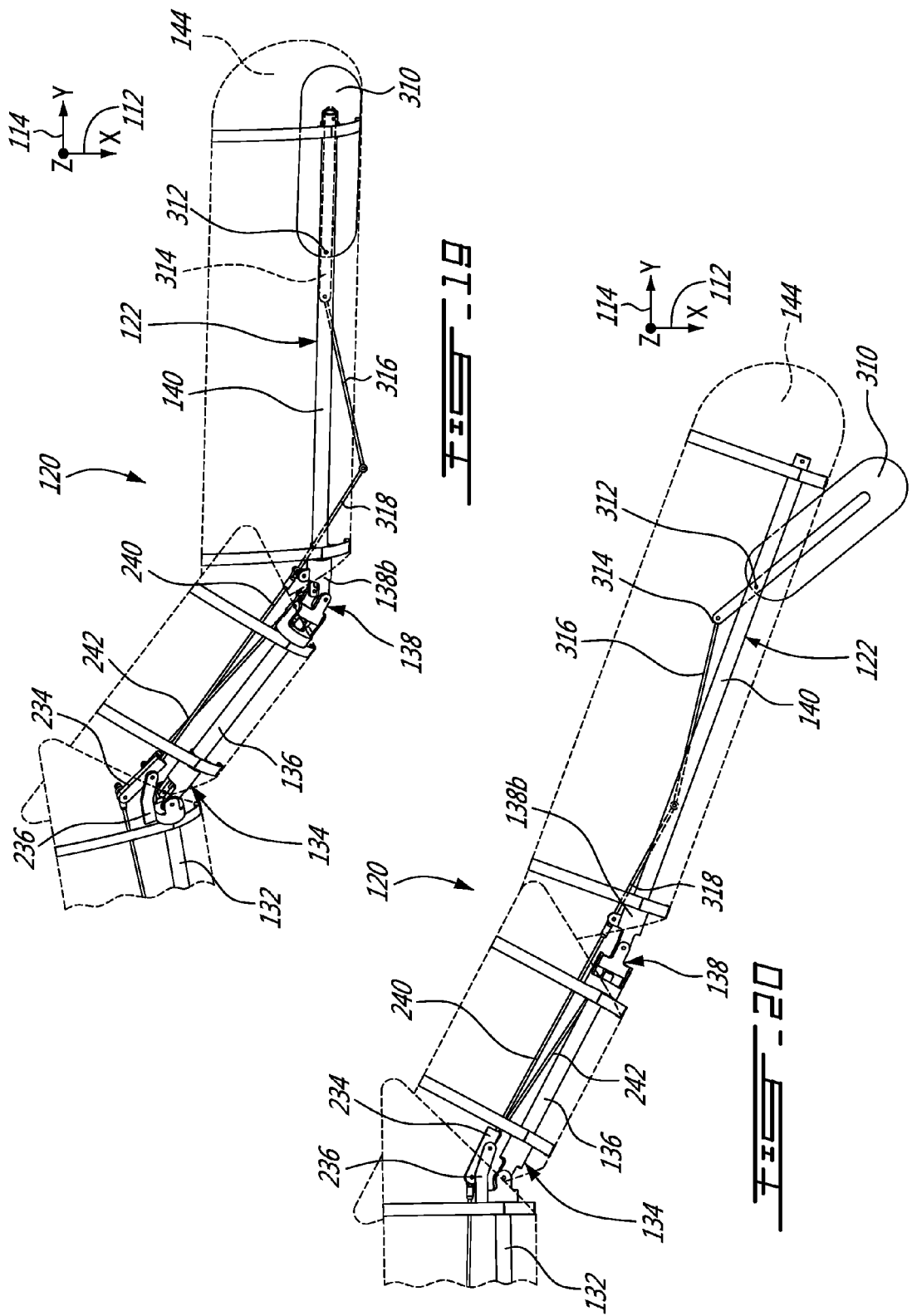

WING FLAPPING MECHANISM AND METHOD

CROSS-REFERENCE

The present case claims the benefit of U.S. Patent Application No. 61/793,335 filed on 15 Mar. 2013, the content of which is hereby incorporated by reference in its entirety.

TECHNICAL FIELD

The technical field relates generally to wing flapping mechanisms for use in flying machines such as ornithopters and orthopters. It also relates to methods of propelling flying machines using flapping wings.

BACKGROUND

Many artificial mechanisms have been suggested in the past in an attempt to imitate the way birds, insects and other animals with wings are flying. This resulted in a number of different constructions. Some of these mechanisms were designed for use in mechanical bird toys while others were designed for use in much larger implementations. However, existing approaches have limitations preventing the wing flapping motions from being fully optimized during a flight. Thus, they are only partially successful in addressing the challenge of creating wing flapping mechanisms that are truly capable of flying as some animals do, particularly birds.

Examples of suggested mechanisms can be found in documents such as U.S. Patent Application Publication No. 2002/0117583 A1 published 29 Aug. 2002 to Hamamoto et al., U.S. Pat. No. 7,651,051 B2 issued 26 Jan. 2010 to Agrawal et al., German Patent Application No. DE 10 2009 015 974 A1 published on 30 Sep. 2010 to FESTO AG & CO, and U.S. Patent Application Publication No. 2012/0003896 published 5 Jan. 2012 to Van Ruymbeke, to name just a few.

Overall, there is still room for many improvements in this area of technology.

SUMMARY

The proposed concept provides a new approach in wing flapping mechanisms for use in flying machines such as ornithopters and orthopters.

In one aspect, there is provided a wing flapping mechanism including: a main frame extending along a longitudinal axis; a pair of opposite wing structures laterally projecting from the main frame, each wing structure including: a triaxial shoulder joint having a proximal end and a distal end, the proximal end of the shoulder joint being pivotally connected to a respective side of the main frame; a first torsion-responsive tube having a proximal end and a distal end, the proximal end of the first torsion-responsive tube being rigidly connected to the distal end of the shoulder joint; an uniaxial elbow joint having a proximal end and a distal end, the proximal end of the elbow joint being rigidly connected to the distal end of the first torsion-responsive tube; a second torsion-responsive tube having a proximal end and a distal end, the proximal end of the second torsion-responsive tube being rigidly connected to the distal end of the elbow joint; a biaxial wrist joint having a proximal end and a distal end, the proximal end of the wrist joint being rigidly connected to the distal end of the second torsion-responsive tube; and a third torsion-responsive tube having a proximal end and a distal end, the proximal end of the third torsion-responsive tube being rigidly connected to the distal end of the wrist joint; and a linkage arrangement to convert rotation of a motor into a three-dimensional cyclic wing motion of each of the wings, the linkage arrangement including torque-transmitting couplings extending from inside the main frame into the wing structures to transmit an alternating pivoting motion, created as a result of the rotation of the motor, to the distal end of a corresponding one of the third torsion-responsive tubes, each torque-transmitting coupling extending inside the shoulder joint, the first torsion-responsive tube, the elbow joint, the second torsion-responsive tube, the wrist joint and the third torsion-responsive tube of the corresponding wing structure.

In another aspect, there is provided a wing flapping mechanism including: a motor, for instance an electric motor, having a unidirectional rotatable output shaft; three spaced-apart rotatable axles that are mechanically connected to the unidirectional rotatable output shaft, the rotatable axles having a same rotation speed and direction during operation of the motor, each full rotation of the rotatable axles corresponding to a wing flapping cycle; and a reciprocately-movable axle that is mechanically connected to the unidirectional rotatable output shaft, the reciprocately-movable axle having a pivoting motion synchronized with the rotation of the rotatable axles and being repeated at each wing flapping cycle.

In another aspect, there is provided a method of transmitting an alternating pivoting motion to a tip of a wing of a wing flapping flying machine using a set of juxtaposed and interconnected torsion-inducing tubes coaxially disposed inside a corresponding set of juxtaposed and interconnected torsion-responsive tubes, the alternating pivoting motion being transmitted between the torsion-inducing tubes regardless of a spatial orientation of the torsion-inducing tubes and of the torsion-responsive tubes.

In another aspect, there is provided a method of generating a wing flapping motion using a wing flapping mechanism provided on a flying machine having two opposite wings, the wing flapping mechanism being capable of creating a sustained flight of the flying machine using mechanical motor power, the wing flapping mechanism driving each wing into a 3D cyclic motion that is a combination of five sub-motions imposed to three juxtaposed and non-collinearly disposed wing segments.

In another aspect, there is provided a method of propelling a flying machine using flapping wings extending from a main frame, each wing including three juxtaposed and non-collinearly disposed wing structure segments, the method including: generating a cyclic three-dimensional flapping motion of each wing; and simultaneously generating a cyclic alternating pivoting sub-motion at a tip of each wing regardless of a relative position of the corresponding wing structure segment.

The proposed concept can also provide a wing flapping mechanism inducing progressive twisting from wing tip to wing base by three juxtaposed torsion-inducing tubes coming from main frame joined to three juxtaposed torsion responsive tubes going back to main frame by a locking pin.

The proposed concept can also provide a lever arm and push-pull rod assembly converting rotation into alternating translation motion in a vertical axis (Z-axis), the push-pull rod being attached to a second shoulder sub-component to make it alternatively pivot around a longitudinal axis (X-axis) in a transversal Y-Z plane so as to generate a flapping sub-motion.

The proposed concept can also provide a lever arm and push-pull rod assembly converting rotation into alternating translation motion in a longitudinal axis (X-axis), the push-pull rod being attached to a third (distal) shoulder sub-component to make it alternatively pivot around a vertical axis (Z-axis) in a horizontal X-Y plane so as to generate a forward-rearward sub-motion.

The proposed concept can also provide a pair of push-pull rods so as to generate a folding-deployment sub-motion, a first one of these push-pull rods being connected to a second shoulder sub-component and to a second rod via an extension of a proximal elbow sub-component, the second push-pull rod connecting the distal end of the first rod to a distal segment of the wrist joint holding a third wing segment, the pair of push-pull rods forcing three wing segments to fold or deploy on themselves in a lateral axis (Y-axis) within an horizontal plane X-Y, the pair of push-pull rods being activated by alternatively pivoting the third (distal) shoulder sub-component in the horizontal plane X-Y around a vertical axis (Z-axis).

The proposed concept can also provide a lever arm and push-pull rod assembly converting rotation into an alternating translation motion in a vertical axis (Z-axis), the push-pull rod being attached to a first (proximal) shoulder sub-component to make it alternatively pivot around a lateral axis (Y-axis) so as to generate a pitch sub-motion.

The proposed concept can also provide a lever arm and push-pull rod assembly converting rotation into an alternating translation motion and then into an alternating pivoting motion around a lateral axis (Y-axis) so as to generate a progressive wing twisting sub-motion, the alternating pivoting motion being transmitted through each wing via three juxtaposed torsion-inducing tubes joined together by intervening torque transmitting members, the three juxtaposed torsion-inducing tubes being connected to three torsion-responsive tubes, for instance, by a locking pin at the wing tip, the three torsion-responsive tube being joined together by a universal joint (wrist) and a pivot joint (elbow) to a universal joint (shoulder), the three torsion-inducing tubes extending inside the three torsion-responding tubes.

The proposed concept can also provide a central mechanism including a motor, a reducer, timing belts and pulleys that are configured and disposed so as to generate a three-dimensional (3D) cyclic motion of wing segments, the 3D motion being a combination, for instance, of the five sub-motions previously defined.

The proposed concept can also provide a central mechanism allowing adjustments so as to achieve angular advances and/or angular delays of one or more sub-motions in a 3D cyclic motion, for instance one or more of the five sub-motions previously defined.

The proposed concept can also provide a central mechanism allowing amplitude optimization independently for each one of the five sub-motions previously defined.

The proposed concept can also provide a mechanism for flapping wings that includes a motor, for instance an electric motor, and a mechanical power distribution system having four axles in continuous rotation and one axle that is in an alternating pivoting motion, all axles being mechanically synchronized during each wing flapping cycle.

The proposed concept can also provide a mechanism for flapping wings using lever arms (cranks) and corresponding push-pull rods to generate translation motions, including one creating an alternating pivoting motion, all of them being synchronized during each wing flapping cycle and having the possibility to be adjusted in amplitude upon changing the position of the connection points of the push-pull rods on the lever arms during operation.

The proposed concept can also provide a mechanism for flapping wings generating a wing flapping motion by the use of a lever arm and push-pull rod mechanism attached to shoulder components.

The proposed concept can also provide a mechanism for flapping wings that is:
generating a progressive alternating pivoting motion using a lever arm and push-pull rod mechanism that interconnects to another one in a way to convert a translation motion into the alternating pivoting motion around a lateral axis that can be amplified via a pulley stage linked to the axis of a first torsion-inducing tube; and/or
generating a progressive alternating pivoting motion from wing tip to wing base via three non-collinear segments, each made of two concentric tubes, the inside one being the "torsion inducer" and the outside tube being the "torsion responder" and each pivoting around the lateral axis or close to it (the torsion-inducing tube being rigid in torsion and the torsion-responsive tube being flexible in torsion), each non-collinear segments being joined by articulations as shoulder-elbow-wrist for the outside tube and flexible members for the inside tubes, the stiffness of the wing structure being enhanced by the inner tube via the articulations of the outer tubes.

The proposed concept can also provide a mechanism for flapping wings that can generate wing longitudinal/folding/flapping sub-motions using a lever arm and push-pull rod mechanism attached at the base of shoulder-elbow segment, shoulder components moving around a longitudinal and vertical coincident axes of rotation, a shoulder-to-elbow segment, interconnecting rods from shoulder to elbow and from elbow to wrist, elbow components around a vertical axis and then wrist components pivoting around longitudinal and vertical axes, and component being moved around longitudinal axis by a push-pull rod to contribute to the folding sub-motion in a proportional way of the flapping sub-motion.

The proposed concept can also provide a mechanism for flapping wings having a wing base pivoting motion using a lever arm and push-pull rod mechanism attached to a first shoulder component and pivoting around a lateral axis.

The proposed concept can also provide a mechanism for flapping wings having shoulder components pivoting around a longitudinal axis and that are mounted on other shoulder components pivoting around a lateral axis.

The proposed concept can also provide a mechanism for flapping wings having shoulder components pivoting around a vertical axis and that are mounted on other shoulder components pivoting around a longitudinal axis and a lateral axis.

The proposed concept can also provide a mechanism for flapping wings having a lateral "torsion-inducing tube" axis running through three shoulder coincident axes (longitudinal, vertical and lateral), the elbow's single vertical axis, and the wrist's two non-coincident longitudinal and vertical axes. It should be noted, however, that the two axes of the wrist joint can be made coincident in some implementations.

The proposed concept can also provide a mechanism for flapping wings using a linear guiding system with an endless screw to adjust the lever arms so as to adjust the amplitude of one or more of the sub-motions, for instance for takeoff, stable flight and landing conditions.

The proposed concept can also provide a mechanism for flapping wings having a wing covering supported in each of the three wing's sections by at least spaced-apart two ribs, each mounted on a corresponding torsion-responsive tube.

The proposed concept can also provide the possibility of using one or more structural extrados airfoil sections as torsion-responsive tubes.

The proposed concept can also provide a mechanism for flapping wings having wing airfoil sections overlapping one another in a way that each section tip support itself on the other one during the wing down stroke of the flapping cycle.

The proposed concept can also provide a mechanism for flapping wings offering the possibility of having a wing tip flap extension for low speed flights by using an extended portion of a push-pull rod to actuate a second rod connected to the wing tip flap extension, the wing tip flap extension pivoting on the wing structure, thus creating three new pivot points.

The technology presented herein can be used in many different fields and for a wide range of applications. Non-limiting examples of potential fields and applications include robotics, toys, military drones, animatronics (for motion pictures, exhibitions, theme or amusement parks or the like), art kinetic structures and educational presentations. Numerous others exist.

Details on these aspects as well as other aspects of the proposed concept will be apparent from the following detailed description and the appended figures.

BRIEF DESCRIPTION OF THE FIGURES

FIG. 4 is a semi-schematic left side view of the wing flapping mechanism shown in FIG. 3;

FIG. 5 is a top view of the left wing structure of the wing flapping mechanism shown in FIG. 3;

FIG. 6 is a front view of the left wing structure shown in FIG. 5;

FIG. 7 is another top view of the left wing structure shown in FIG. 5;

FIG. 8 is an isometric rear view of the proximal portion of the left wing structure of the wing flapping mechanism shown in FIG. 3;

FIG. 9 is a vertical cross-sectional rear view of the left shoulder joint of the wing flapping mechanism shown in FIG. 3;

FIG. 10B is a view similar to FIG. 10A, showing an alternative configuration;

FIGS. 19 and 20 are top views of the left wing of the mechanical bird shown in FIG. 1 to illustrate an example of an optional wing extension.

DETAILED DESCRIPTION

Figure 1:
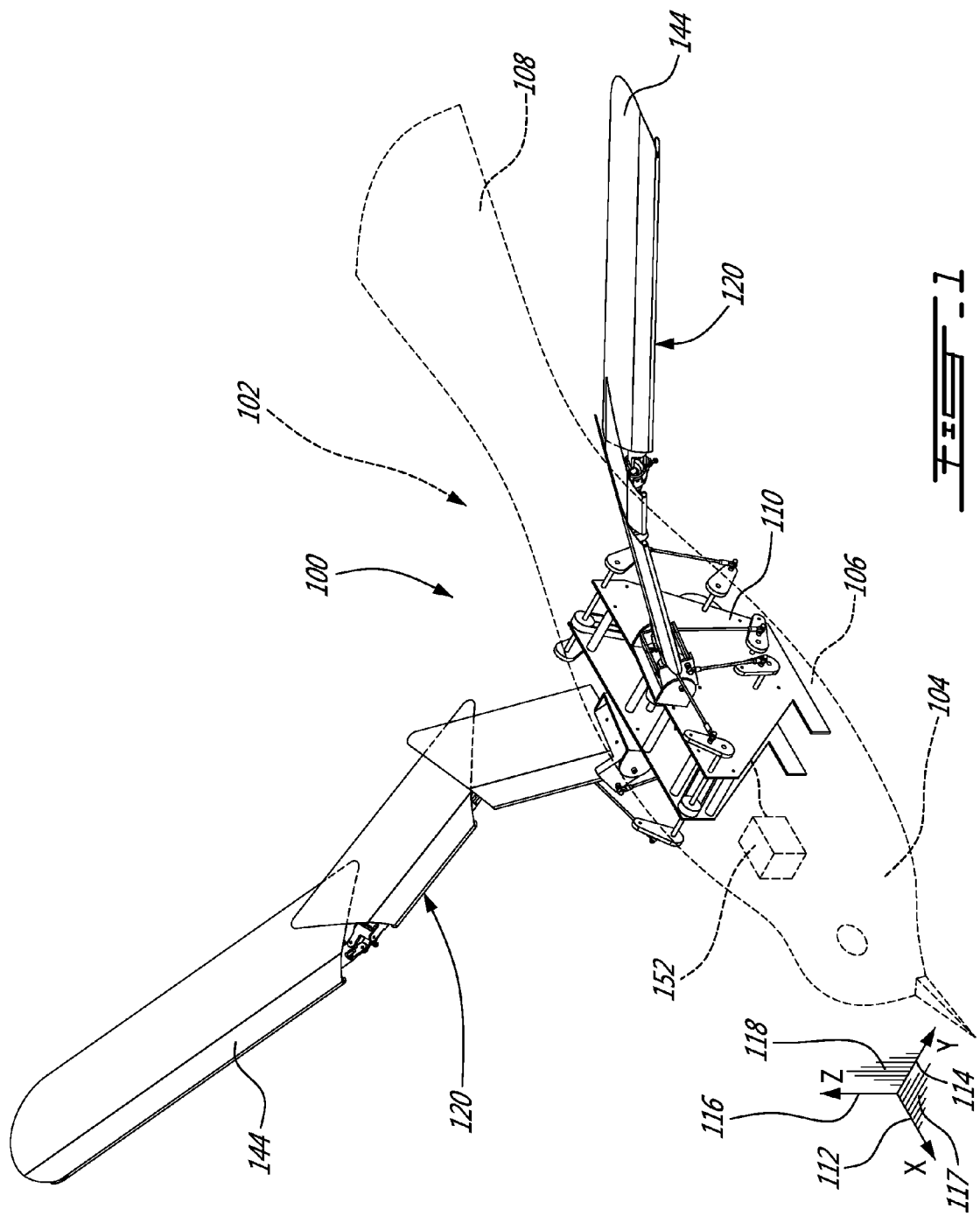
FIG. 1 is a semi-schematic view of an example of a wing flapping mechanism as suggested herein, the wing flapping mechanism being provided inside an example of a generic mechanical bird.

FIG. 1 is a semi-schematic view of an example of a wing flapping mechanism 100 as suggested herein. This wing flapping mechanism 100 is provided inside an example of a generic mechanical bird 102. Such mechanical bird 102 can also be called an ornithopter or an orthopter.

FIG. 1 is only an example of a possible implementation. The wing flapping mechanism 100 can also be used with other kinds of flying machines using flapping wings, including ones that are not shaped as birds or the like. The flying machines can be significantly larger in size than birds as well. Still, the wing flapping mechanism 100 could be used in machines that are not capable of flying for real. Non-limiting examples of potential fields and applications include robotics, toys, military drones, animatronics (for motion pictures, exhibitions, theme or amusement parks or the like), art kinetic structures and educational presentations. Numerous others exist.

The illustrated mechanical bird 102 includes a head section 104, a main body 106, a tail section 108 and two opposite wings 120. It has a substantially symmetric construction with reference to the lengthwise direction, i.e. the left side and the right side being substantially symmetric in construction.

The wing flapping mechanism 100 includes a central main frame 110 that is generally extending along a longitudinal axis 112 and that is located inside the main body 106 of the mechanical bird 102. The longitudinal axis 112 is substantially coextensive with the lengthwise direction of the mechanical bird 102. This longitudinal axis 112 corresponds to the X-axis in the figures. The lateral axis 114 (left to right or right to left) corresponds to the Y-axis in the figures. The vertical axis 116 corresponds to the Z-axis in the figures. The main frame 110 includes two spaced-apart main plates 160. The plates 160 extend parallel to one another and also parallel to the longitudinal axis 112. Laterally-extending spacer bars 162 are attached in-between the plates 160 at various locations. Variants are possible as well. FIG. 1 further illustrates the horizontal X-Y plane 117 and the transversal Y-Z plane 118.

Figure 2:
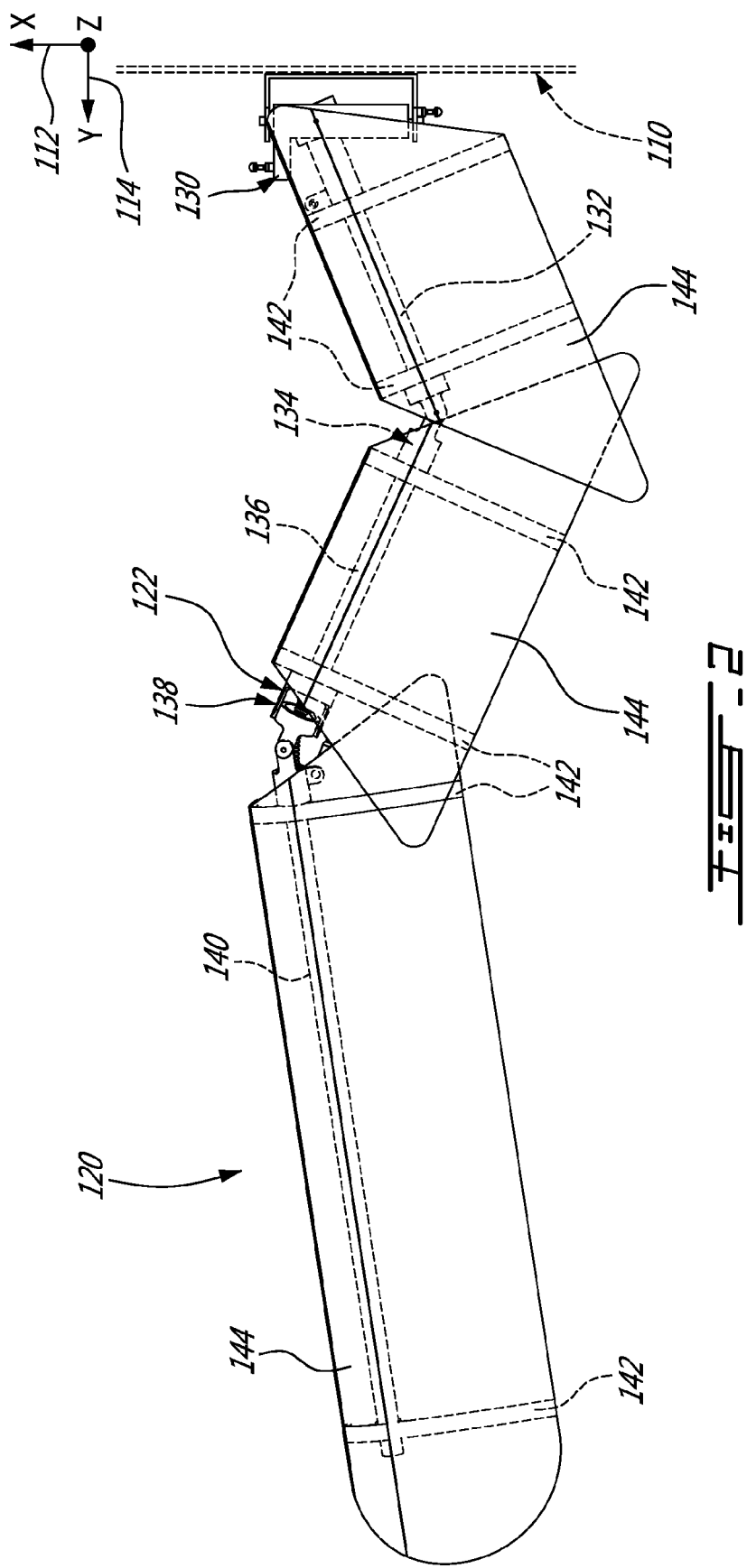
FIG. 2 is a top view of the left wing on the mechanical bird shown in FIG. 1.

FIG. 2 is a top view of the left wing 120 of the mechanical bird 102 shown in FIG. 1. The right wing 120 is substantially a mirror image of the left wing 120 of FIG. 2. Thus, although the following explanations about the wing structures are referring to the illustrated left wing structure 122, they are also applicable to the right wing structure 122.

The wing flapping mechanism 100 includes a pair of opposite wing structures 122 laterally projecting from the main frame 110. One is the right wing structure and the other is the left wing structure. Both wing structures 122 have a construction that is substantially a mirror image of the other.

Figure 3:
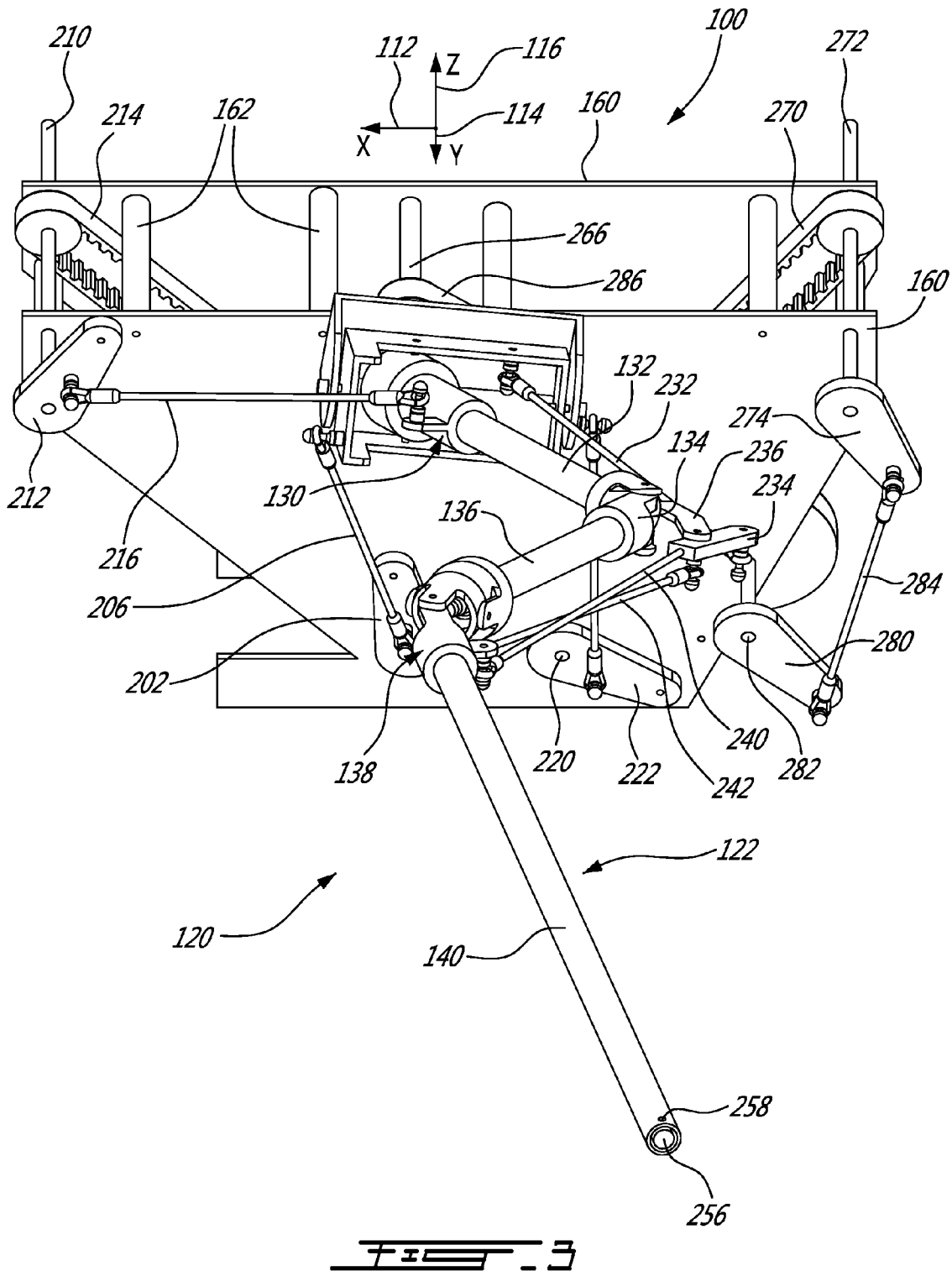
FIG. 3 is an isometric side view illustrating the main frame and the left wing structure of the wing flapping mechanism shown in FIG. 1.

FIG. 3 is an isometric side view illustrating the main frame 110 and the left wing structure 122 of the wing flapping mechanism 100.

FIG. 4 is a semi-schematic left side view of the wing flapping mechanism 100.

FIG. 5 is a top view of the left wing structure 122 of the wing flapping mechanism 100.

FIG. 6 is a front view of the left wing structure 122 shown in FIG. 5.

FIG. 7 is another top view of the left wing structure 122 shown in FIG. 5.

As can be seen, each wing structure 122 is made of a plurality of parts interconnected to one another. In the illustrated example, it includes a triaxial shoulder joint 130, a first torsion-responsive tube 132, a uniaxial elbow joint 134, a second torsion-responsive tube 136, a biaxial wrist joint 138 and a third torsion-responsive tube 140. The various joints 130, 134, 138 of each wing structure 122 are named herein according to the relative position of analogous parts in birds. This is only for the sake of clarity.

Each part of the wing structure 122 includes a proximal end and a distal end. It should be noted at this point that the expressions "proximal end" and "distal end" are referring to the relative position of these opposite ends with reference to the main frame 110.

As can be seen in FIGS. 2 to 7, the proximal end of the shoulder joint 130 is pivotally connected to the side of the corresponding plate 160 of the main frame 110. More details about the construction of the shoulder joint 130 will be given later in the text.

The proximal end of each first torsion-responsive tube 132 is rigidly connected to the distal end of the corresponding shoulder joint 130. The first torsion-responsive tube 132 has an elongated and rectilinear shape in the illustrated example. It also has a hollow cylindrical body with an inner circular cross section. Variants are possible as well.

The second torsion-responsive tube 136 has a proximal end and a distal end. The proximal end of the second torsion-responsive tube 136 is rigidly connected to the distal end of the corresponding elbow joint 134. The second torsion-responsive tube 136 has an elongated and rectilinear shape in the illustrated example. It also has a hollow cylindrical body with an inner circular cross section. Variants are possible as well.

The third torsion-responsive tube 140 has a proximal end and a distal end. The proximal end of the third torsion-responsive tube 140 is rigidly connected to the distal end of the wrist joint 138. The third torsion-responsive tube 140 has an elongated and rectilinear shape in the illustrated example. It also has a hollow cylindrical body with an inner circular cross section. Variants are possible as well.

The wing structure 122 is generally extending along the lateral axis 114. However, most of time during the motion of the wings 120, and as best shown from the top in FIGS. 2, 5 and 7, the distal end of the first torsion-responsive tube 132 is slightly towards the rear with reference to the proximal end thereof, the distal end of the second torsion-responsive tube 136 is slightly towards the front with reference to the proximal end thereof, and the distal end of the third torsion-responsive tube 140 is slightly towards the rear with reference to the proximal end thereof. Thus, when viewed from the top, the wing structure 122 has a somewhat zigzag shape.

In the illustrated example, spaced-apart ribs 142 are rigidly connected to the outer surface of the first torsion-responsive tube 132, the second torsion-responsive tube 136 and the third torsion-responsive tube 140 to support of corresponding set of three distinct juxtaposed airfoil sections 144, as shown for instance in FIG. 2. There are at least two ribs 142 for each portion of the wing. Each rib 142 is substantially arc-shaped to give the shape to the airfoil sections 144. Each rib 142 is also orthogonal with reference to the corresponding tube. The skin of the airfoil sections 144 can be made of a sheet-like material. This skin can be provided at the top of the airfoil sections 144 or on both sides (top and bottom) of the airfoil sections 144. Other variants are possible as well.

In the illustrated example, the airfoil sections 144 are overlapping one another in a way that each section tip support itself on the other one during a complete wing flapping cycle. Many variants are possible as well. For instance, depending on the implementations, the spaces between the airfoil sections 144 can remain open and/or be covered with an elastic material of the like. Still, the airfoil sections 144 may also include a more complex construction in some implementations and also be designed as structural extrados airfoil sections (see for instance in FIG. 10C) to replace corresponding ones of the torsion-responsive tubes 132, 136, 140 shown in FIG. 3. Other variants are also possible.

The illustrated wing flapping mechanism 100 further includes a single electric motor 150 to generate the mechanical torque upon rotation of the motor 150 and thus drive the two wing structures 122 into motion. The motor 150 is located inside the main frame 110 and is supported using internal brackets or the like. The motor 150 is schematically illustrated in FIG. 4. The motor 150 is powered using one or more batteries 152 located inside the main body 106 of the mechanical bird 102. Variants are also possible. For instance, one can design the wing flapping mechanism 100 with two or more motors, such as with one motor per side for providing the mechanical motor power to a corresponding one of the wing structures 122. These motors could be synchronized electronically. One can also provide more than one motor driving a same mechanical output for the sake of redundancy. Still, one could use a plurality of servomotors to drive each axle or some of the axles independently from one another. Some implementations can include an internal combustion engine for generating the mechanical torque and/or for powering the electric motor(s) 150 and any servomotor through a generator or the like. In relatively small implementations, for instance toys, the motor(s) 150 can be in the form of one or more spring-loaded mechanisms or the like. Many other variants are possible as well.

To increase the output torque and decrease its rotation speed, the motor 150 includes a speed-reduction transmission 170 or another suitable similar arrangement that is mechanically connected between the rotor inside the motor 150 and an output shaft 154 that is laterally disposed inside the two spaced-apart main plates 160 of the main frame 110. The speed-reduction transmission 170 can include a set of gears, for instance a planetary gear train or the like. Variants are possible as well.

FIG. 8 is an isometric rear view of the left wing structure 122.

FIG. 9 is a vertical cross-sectional rear view of the proximal portion of the left wing structure 122.

As can be seen in FIGS. 8 and 9, each shoulder joint 130 includes three juxtaposed subsections 130a, 130b, 130c that are pivotally connected to one another. The first shoulder joint subsection 130a defines the proximal end of the shoulder joint 130 and is pivotally connected to the corresponding side of the main frame 110 around a first pivot axis 130d. This first pivot axis 130d extends substantially parallel to the lateral axis 114 (Y-axis). Thus, when viewed from the side, the first shoulder joint subsection 130a pivots clockwise and counterclockwise around the first pivot axis 130d.

The illustrated first shoulder joint subsection 130a includes a main plate member 130a' extending parallel and adjacent to the corresponding one of the plates 160 of the main frame 110. It also includes two flanged members 130a" provided at opposite front and rear ends of the main plate member 130a' and projecting perpendicularly in the outward direction. Variants are possible as well.

The illustrated second shoulder joint subsection 130b is pivotally connected to the corresponding first shoulder joint subsection 130a around a second pivot axis 130e. This second pivot axis 130e extends substantially parallel to the longitudinal axis 112 (X-axis) in the illustrated example, i.e. the second pivot axis 130e extends substantially parallel to the longitudinal axis 112 when the first shoulder joint subsection 130a is at a neutral position. A large part of the up and down motions of the corresponding wing 120 will come from motions around the second pivot axis 130e.

Also, the illustrated second shoulder joint subsection 130b is in the form of a box-shaped member opened on the outward-facing side thereof and whose opposite ends are connected to the flanged members 130a" of the first shoulder joint subsection 130a. Variants are also possible.

The third shoulder joint subsection 130c defines the distal end of the shoulder joint 130 and is pivotally connected to the corresponding second shoulder joint subsection 130b around a third pivot axis 130f. The third pivot axis 130f extends substantially orthogonal with reference to both the first pivot axis 130d and the second pivot axis 130e. A large part of the forward and rearward motions around the vertical axis 116 (Z-axis) of the corresponding wing 120 will come from motions around the third pivot axis 130f. The third shoulder joint subsection 130c includes a socket member 130c' that is partially inserted inside the second shoulder joint subsection 130b. The third shoulder joint subsection 130c projects substantially outward from the second shoulder joint subsection 130b. Variants are possible as well.

Also, in the illustrated example, the first, second and third pivot axes 130d, 130e, 130f of each shoulder joint 130 are substantially intersecting one another.

In the illustrated example, the proximal end of each first torsion-responsive tube 132 is inserted inside and rigidly connected to the socket member 130c' of the corresponding third shoulder joint subsection 130c.

The wing flapping mechanism 100 includes a linkage arrangement to convert rotation of the motor 150 into a three-dimensional (3D) cyclic wing motion of each of the wing structure 122. The linkage arrangement of the illustrated example includes parts that are located inside the main frame 110 and parts that are located outside the main frame 110.

In the illustrated example, the first sub-motion is the flapping sub-motion created when the second shoulder joint subsection 130b pivots around the longitudinal axis 112 (X-axis). The second sub-motion is the forward-rearward sub-motion created when the third shoulder joint subsection 130c pivots around the vertical axis 116 (Z-axis). The third sub-motion is the folding-deployment sub-motion during which the wing segments fold or deploy on themselves along the lateral axis 114 (Y-axis), thus within the horizontal X-Y plane 117. The fourth sub-motion is pitch sub-motion created when the first shoulder joint subsection 130a pivots around the lateral axis 114 (Y-axis). The fifth sub-motion is the progressive wing twisting sub-motion created when the wing tip is pivoted around the lateral axis 114 (Y-axis), thereby transmitting an alternating pivoting motion through the wing structure 122.

The linkage arrangement includes an arrangement to transmit an alternating pivoting motion at the distal end of both third torsion-responsive tubes 140. This alternating pivoting motion generates an alternating cyclic motion for progressively twisting the wing substantially around the lateral axis 114 (Y-axis in the figures). The alternating pivoting motion is created as a result of the rotation of the motor 150. In the illustrated example, it is transmitted directly to the distal end of each third torsion-responsive tube 140 using torsion-inducing tubes 252, 254, 256 that are coaxially disposed inside the corresponding torsion-responsive tubes 132, 136, 140 and free to pivot therein. The torsion-inducing tubes 252, 254, 256 are made of a rigid material, both in torsion and in flexion. They are also increasing the rigidity of the wing structure 122.

It should be noted that the word "tube" used in the expression "torsion-inducing tube" refers generically to a slender part having an elongated body and not necessarily to a part that has a hollow interior channel. For instance, the torsion-inducing tubes 252, 254, 256 can be constructed as bars, rods, or the like, having a solid interior. Other variants are possible as well.

As shown for instance in FIG. 5, the first torsion-inducing tube 252 of the illustrated example is coaxially disposed inside the corresponding first torsion-responsive tube 132. The proximal end of the first torsion-inducing tube 252 is pivotally mounted inside the socket member 130c' of the shoulder joint 130. The distal end of the first torsion-inducing tube 252 is pivotally mounted inside the proximal end member 134a of the elbow joint 134.

The second torsion-inducing tube 254 of the illustrated example is coaxially disposed inside the corresponding second torsion-responsive tube 136. The proximal end of the second torsion-inducing tube 254 is pivotally mounted inside the distal end member 134b of the elbow joint 134. The distal end of the second torsion-inducing tube 254 is pivotally mounted inside the proximal end member 138a of the wrist joint 138.

The third torsion-inducing tube 256 of the illustrated example is coaxially disposed inside the third torsion-responsive tube 140. The proximal end of the third torsion-inducing tube 256 is pivotally mounted inside the distal end member 138b of the wrist joint 138. The distal end of the third torsion-inducing tube 256 is rigidly connected to the distal end of the third torsion-responsive tube 140, for instance using a locking pin 258 as shown or the like. The locking pin 258 transfers the torque directly to the distal end of the third torsion-responsive tube 140. However, because of the configuration of the various parts, no torque is being transmitted directly from the torsion-inducing tubes 252, 254, 256 to the other parts of the wing structure 122 that are closer to the main frame 110.

In use, the proximal end of first torsion-inducing tube 252 receives torque coming from inside the main frame 110 through a first flexible torque-transmitting member 260. The first flexible torque-transmitting member 260 is coaxially disposed inside the corresponding shoulder joint 130 and couples a reciprocately-movable axle 266 to the first torsion-inducing tube 252. A second flexible torque-transmitting member 262 is coaxially disposed inside the corresponding elbow joint 134 and couples the distal end of the first torsion-inducing tube 252 to the proximal end of the second torsion-inducing tube 254. A third flexible torque-transmitting member 264 is coaxially disposed inside the corresponding wrist joint 138 and couples the distal end of the second torsion-inducing tube 254 to the proximal end of the third torsion-inducing tube 256. The geometrical centers of the first and second flexible torque-transmitting members 260, 262 are substantially coincident with the center of their corresponding joints 130, 134. The geometrical center of the third flexible torque-transmitting member 264 is substantially coincident with a medial axis between the first and second pivot axes 138d, 138e of the wrist joint 138.

Also, in the illustrated example, each flexible torque-transmitting member 260, 262, 264 is a coiled spring. Variants are also possible. For instance, one or more of the flexible torque-transmitting members 260, 262, 264 can be an elastomeric part, namely an elongated tubular part or the like made of an elastomeric material that is flexible when subjected to bending motions but at the same time that is capable of transmitting torque without significantly twisting on itself. Other variants are possible as well.

The first torsion-responsive tube 132, the second torsion-responsive tube 136 and the third torsion-responsive tube 140 are relatively flexible in torsion. The alternating pivoting motion at the distal end of the third torsion-responsive tubes 140 transmits a torsion bias in the corresponding wing 120 towards the proximal end of the corresponding first torsion-responsive tube 132.

Figure 10A:
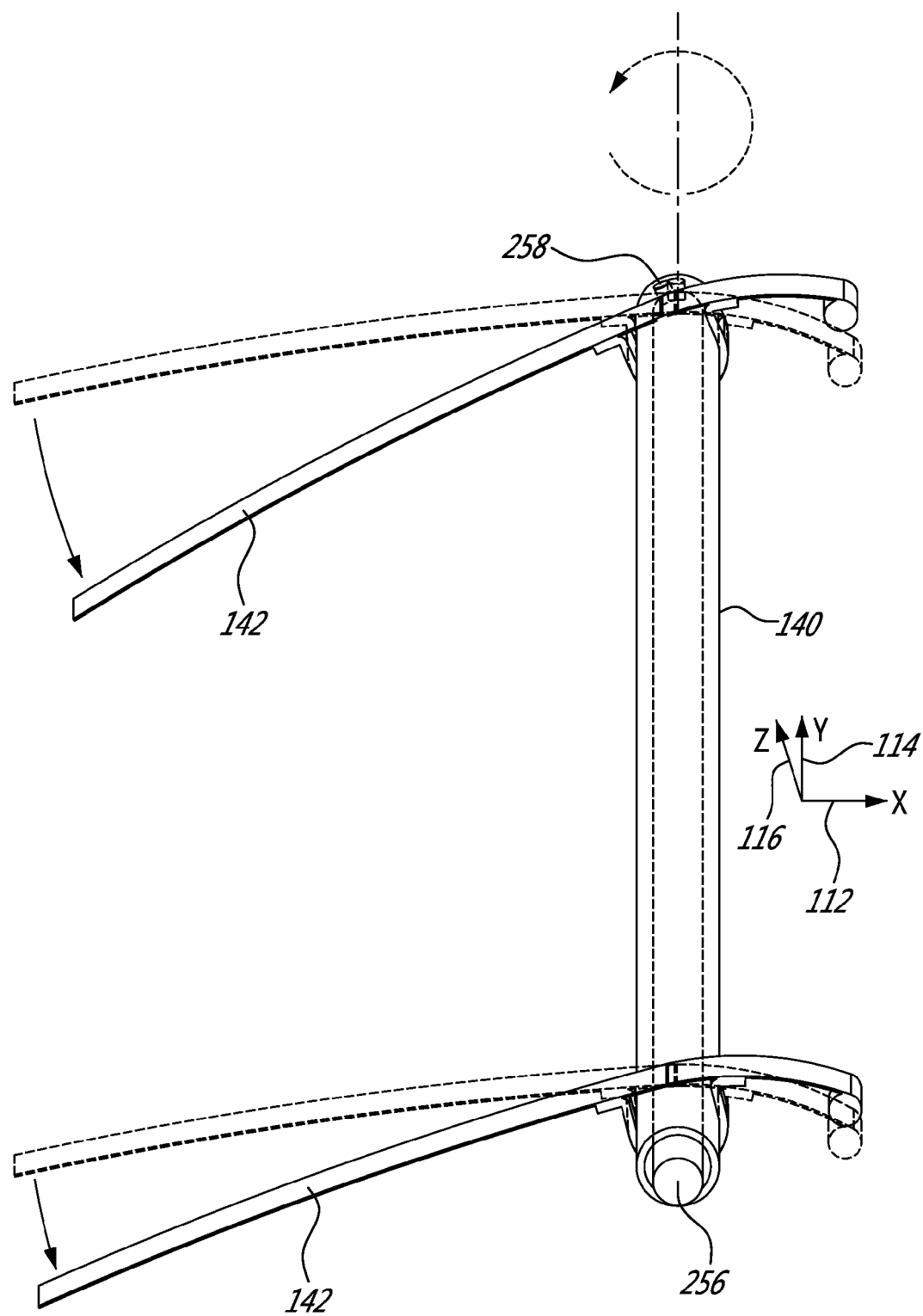
FIG. 10A is a semi-schematic view of the left third torsion-responsive tube of the wing flapping mechanism shown in FIG. 3 to illustrate the effect of the torque being applied at the distal end thereof.

FIG. 10A is a semi-schematic view of the left third torsion-responsive tube 140 of the wing flapping mechanism 100 to illustrate the effect of the torque being applied at the distal end thereof. The alternating pivoting motion is also applied in the opposite direction during a same cyclic motion. The locking pin 258 transfers the torque coming from the third torsion-inducing tube 256 to the distal end of the third torsion-responsive tube 140. Since the third torsion-responsive tube 140 is made of a material that is relatively flexible in torsion, the torque forces the distal end of the third torsion-responsive tube 140 to twist in the direction of the torque and the torque is transmitted towards the proximal end of the third torsion-responsive tube 140. The rib 142 near the distal end of the third torsion-responsive tube 140 will twist more than the other ribs 142 that are closer to the main frame 110. As aforesaid, the ribs 142 are rigidly connected to the surface of the third torsion-responsive tube 140 in the illustrated example, as well as the surface of the first torsion-responsive tube 132 and the second torsion-responsive tube 136 (see for instance in FIG. 5). The torque transmitted from the distal end to the proximal end of the third torsion-responsive tube 140 is also transmitted to the distal end of the second torsion-responsive tube 136, thus all the way towards the shoulder joint 130. However, the twisting effect of the torque will decrease towards the center. The elasticity of the materials can be chosen according to the desired effect.

FIG. 10B is a view similar to FIG. 10A but shows an alternative configuration. In FIG. 10B, the third torsion-responsive tube 140 is made relatively short and the distal end of the third torsion-inducing tube 256 is not directly attached to the distal end of the third torsion-responsive tube 140. Instead, the rib 142 at the distal end of the wing 120 is rigidly attached directly to the third torsion-inducing tube 256. The torque coming from the third torsion-inducing tube 256 is transmitted to the third airfoil section 144 by the rib 142 and from there, to the rib 142 that is rigidly attached to the distal end of the short third torsion-responsive tube 140. The propagation of the twisting towards the center is then achieved as in FIG. 10A for the other components. This alternative configuration can be done when the third airfoil section 144 has a structure designed to function as the third torsion-responsive tube 140 in FIG. 10A. In other words, it can transmit and suitably respond to the torque as the third torsion-responsive tube 140 does. Reducing the length of the third torsion-responsive tube 140 can save weight. In FIG. 10B, one can also consider that the airfoil section 144 and the third torsion-responsive tube 140, combined together, are the equivalent of the third torsion-responsive tube 140 in FIG. 10A.

Figure 10C:
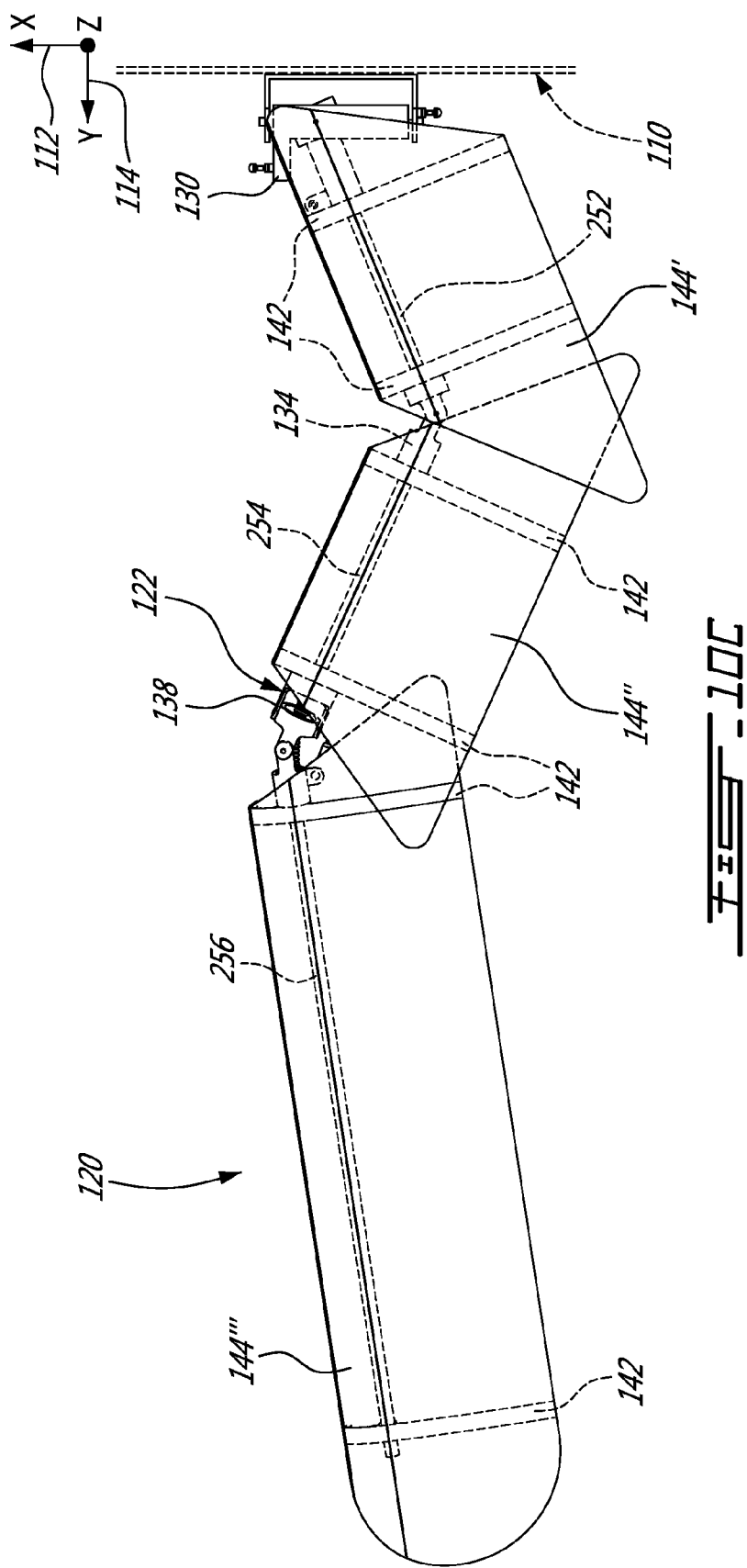
FIG. 10C is a view similar to FIG. 2, showing another alternative configuration.

FIG. 10C is a view similar to FIG. 2. It shows another alternative configuration. In FIG. 10C, the torsion-responsive tubes are not the torsion-responsive tubes 132, 136, 140 as in the other figures but rather entirely replaced by the corresponding sections 144', 144", 144''' of a structural extrados airfoil. The structural extrados airfoil is designed to twist when subjected to a torsion at the wing tip but it also provides the torsional spring force opposing the torque. The rigidity of the wings 120 is given by the torsion-inducing tubes 252, 254, 256. The ribs 142 are also rigidly attached directly on the corresponding joint in this example. For instance, one of the ribs 142 is attached to the distal end of the wrist joint 138 while another one is attached to the proximal end thereof. Another one of the ribs 142 is rigidly attached to the distal end of the elbow joint 134 while one is attached to the proximal end thereof. Finally, one rib 142 is attached to the distal end of the shoulder joint 130.

In use, using the arrangement shown in FIG. 10C, the torque coming from the third torsion-inducing tube 256 is transmitted to the tip of the third structural extrados airfoil section 144''' located at the distal end of the third torsion-inducing tube 256 via the rib 142. The rib 142 is rigidly attached to the third torsion-inducing tube 256. The torque will twist the third structural extrados airfoil section 144''' and will be transmitted to the next rib 142 towards the center. This second rib 142, however, is not rigidly attached to the third torsion-inducing tube 256 since it is attached directly to the distal end of the wrist joint 138. The wrist joint 138 will transmit what remains of the torque at that location to the next rib, namely the rib 142 of the second structural extrados airfoil section 144". What is left of the torque at the inboard end of the second structural extrados airfoil section 144" will be transmitted to the first structural extrados airfoil section 144'. The propagation of the twisting towards the center is thus achieved somewhat like in FIG. 10A. This alternative configuration can be done when all structural extrados airfoil sections 144', 144", 144''' have a function very similar to that of the torsion-responsive tubes 132, 136, 140, i.e. which can transmit and suitably respond to the torque as the torsion-responsive tubes 132, 136, 140 do. Therefore, the structural extrados airfoil sections 144', 144", 144''' are considered to be torsion-responsive tubes. Using the structural extrados airfoil sections 144', 144", 144''' instead of the torsion-responsive tubes 132, 136, 140 of the other examples can save weight. Variants are possible as well.

It should be noted that one can use the features presented in FIG. 10C for only some of the torsion-responsive tubes 132, 136, 140, if desired. Still, the features presented in FIGS. 10B and 10C can be combined in a same implementation.

Figure 11:
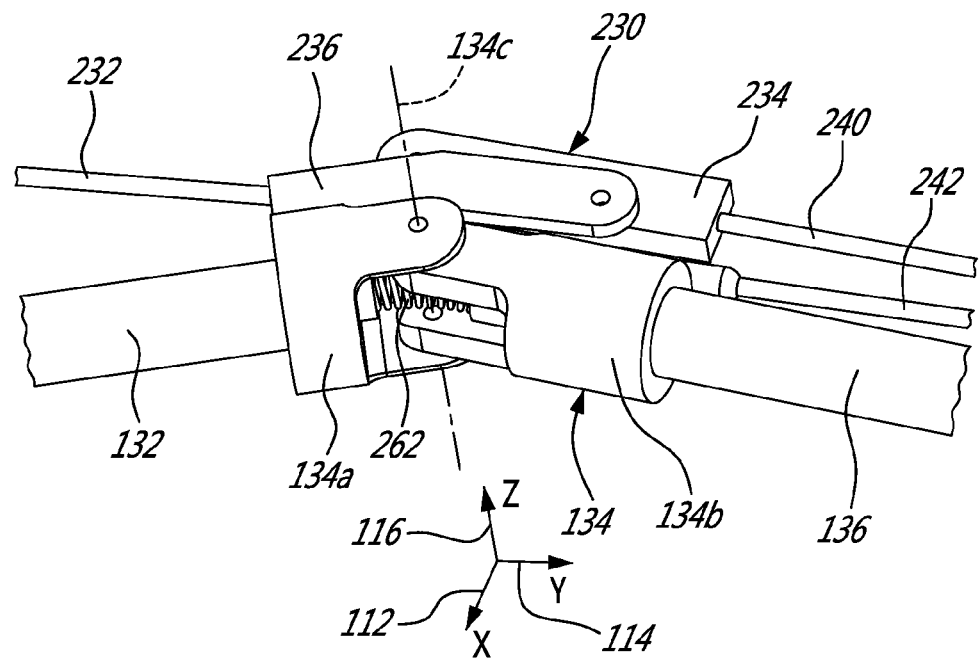
FIG. 11 is an isometric top view of the left elbow joint of the wing flapping mechanism shown in FIG. 3.
Figure 12:
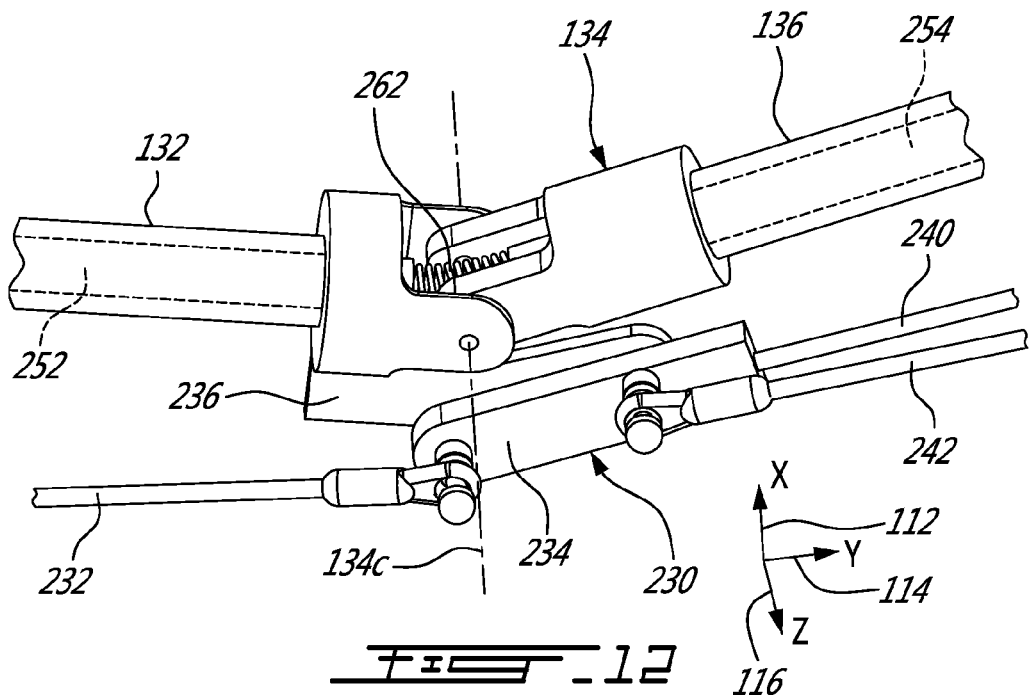
FIG. 12 is an isometric bottom view of the left elbow joint shown in FIG. 11.

FIGS. 11 and 12 are isometric top and bottom views of the left elbow joint 134 of the wing flapping mechanism 100, respectively.

The illustrated elbow joint 134 has a proximal end member 134a and a distal end member 134b. Both of these members 134a, 134b are pivotally connected to one another using a pivot axis 134c that is substantially vertical. This elbow joint 134 is designed so that the distal end member 134b can only pivot around the substantially vertical pivot axis 134c with reference to the proximal end member 134a. The proximal end member 134a of each elbow joint 134 is rigidly connected to the distal end of the corresponding first torsion-responsive tube 132. Variants are also possible.

Figure 13:
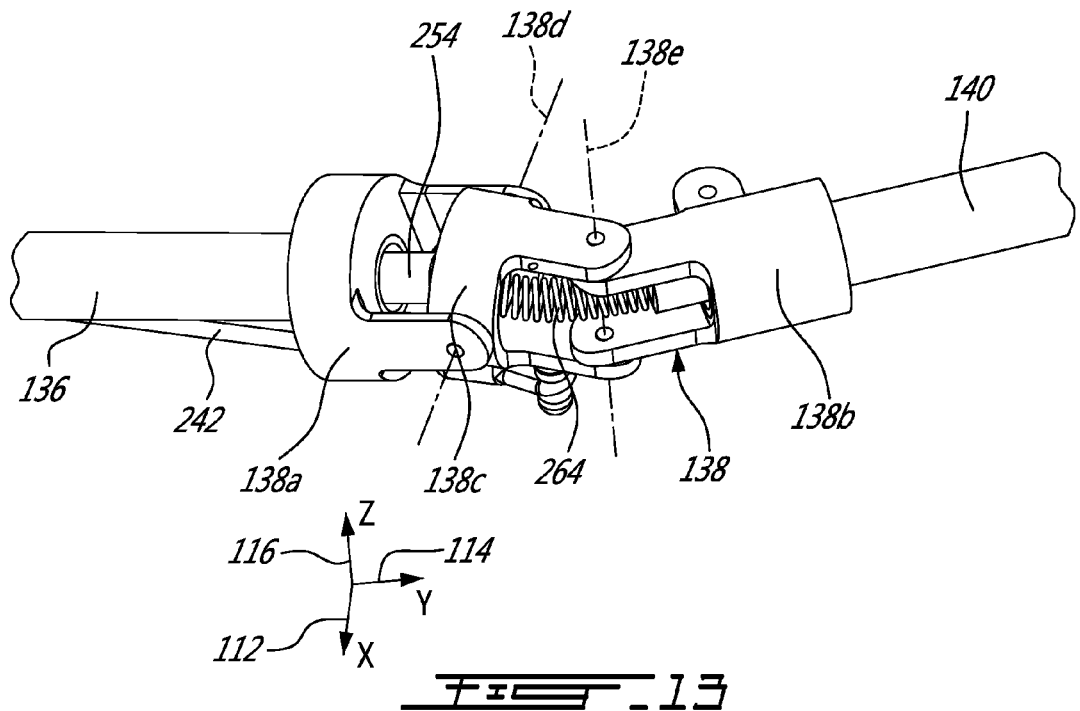
FIG. 13 is an isometric top view of the left wrist joint of the wing flapping mechanism shown in FIG. 3.
Figure 14:
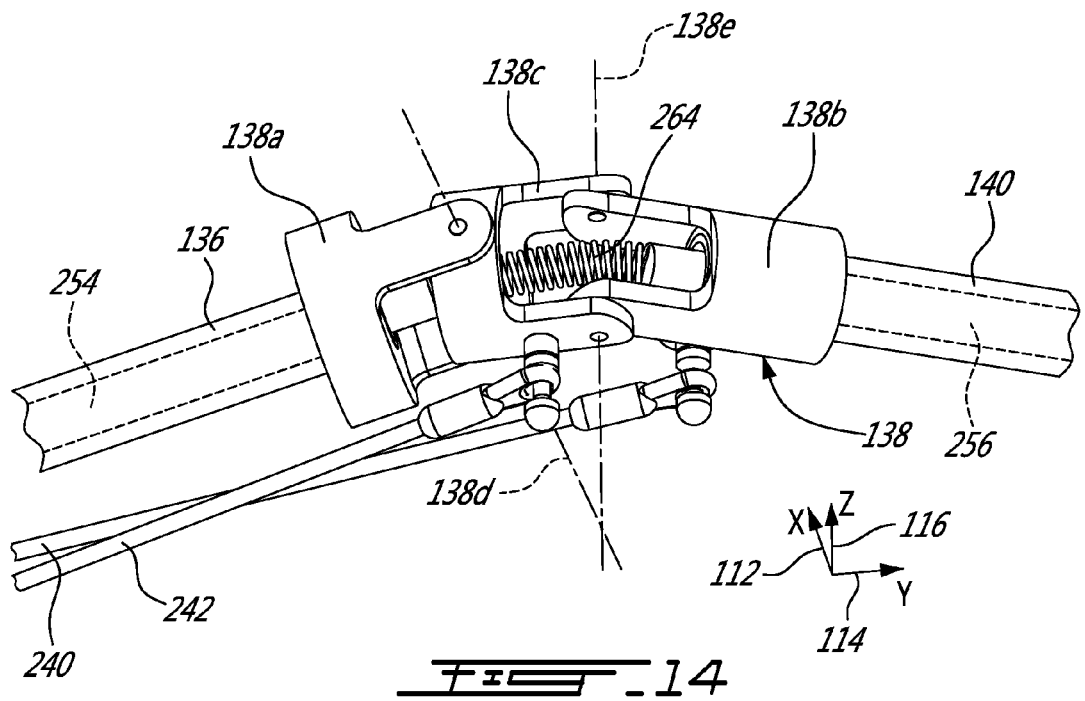
FIG. 14 is an isometric bottom view of the left wrist joint shown in FIG. 13.

FIGS. 13 and 14 are isometric top and bottom views of the left wrist joint 138 of the wing flapping mechanism 100, respectively.

The illustrated wrist joint 138 has a proximal end member 138a and a distal end member 138b. Both of these members 138a, 138b are pivotally connected to one another through a mesial member 138c that is configured and disposed to create a universal joint connection. The yoke of the proximal end member 138a and the yoke of the distal end member 138b are thus orthogonal to one another. The proximal end member 138a is pivotally connected to the mesial member 138c around a first pivot axis 138*d* while the mesial member 138*c* is pivotally connected to the distal end member 138*b* around a second pivot axis 138*e*. The first pivot axis 138*d* is substantially horizontal when the wing 120 is in a neutral (or near horizontal) position and the second pivot axis 138*e* is substantially vertical when the wing 120 is in a neutral (or near horizontal) position. The proximal end member 138*a* is rigidly connected to the distal end of the corresponding second torsion-responsive tube 136. Variants are possible as well.

As aforesaid, the linkage arrangement includes parts that are located inside the main frame 110 and parts that are located outside the main frame 110. Referring back to the example of FIG. 4, the parts of the linkage arrangement that are inside the main frame 110 are shown through transparency for the sake of illustration. These parts include a first lateral axle 200 to which are connected two first lever arms 202 located outside the main frame 110. There is one first lever arm 202 for each side, thus one at the right, one at the left of the main frame 110.

In the illustrated example, the first lateral axle 200 is mechanically connected to the output shaft 154 through a first timing belt 204 set around a corresponding pair of pulleys. Still, in the example of FIG. 4, the output shaft 154 rotates in the counterclockwise direction and the first lever arm 202 also rotates in the counterclockwise direction. The first lever arm 202 is operatively connected to the second shoulder joint subsection 130*b* through a first push-pull rod 206. The top end of the first push-pull rod 206 is operatively connected to the side of the second shoulder joint subsection 130*b* using a side pin 208. FIG. 6 shows it from a different angle. Variants are also possible.

The first timing belt 204 includes inner teeth engaging corresponding teeth on the corresponding pulleys. This configuration prevents slippage between them, which would otherwise modify the relative positioning of the parts. Variants of this configuration are also possible. For instance, one can use a chain with corresponding sprockets, sets of gears, etc. This also applies to the other timing belts/pulleys of the illustrated example.

The illustrated linkage assembly further includes a second lateral axle 210 inside to which are connected two second lever arms 212 located outside of the main frame 110. There is one second lever arm 212 for each side, thus one at the right, one at the left of the main frame 110. The second lateral axle 210 is mechanically connected to the first lateral axle 200 through a second timing belt 214 set around a corresponding pair of pulleys. The second lever arm 212 rotates in the counterclockwise direction and at the same rotation speed as the first lateral axle 200 in this example. The second lever arm 212 is operatively connected to the third shoulder joint subsection 130*c* through a second push-pull rod 216. The rear end of the second push-pull rod 216 is operatively connected to the side of the third shoulder joint subsection 130*c* using a side pin 218. Variants are also possible.

The illustrated linkage assembly also includes a third lateral axle 220 to which are connected two third lever arms 222 located outside the interior of the main frame 110. There is one third lever arm 222 for each side, thus one at the right, one at the left of the main frame 110. The third lateral axle 220 is mechanically connected to the first lateral axle 200 through a third timing belt 224 set around a corresponding pair of pulleys. The third lever arm 222 rotates in the counterclockwise direction in this example. The third lever arm 222 is operatively connected to the first shoulder joint subsection 130*a* through a third push-pull rod 226. The top end of the third push-pull rod 226 is operatively connected to the side of the first shoulder joint subsection 130*a* using a side pin 228.

The first, second and third lateral axles 200, 210, 220 are configured and disposed so that each rotation of the output shaft 154 (i.e. at the output of the speed-reduction transmission 170) corresponds to one wing flapping cycle of the wings 120. Each one among the lever arms 202, 212, 222 imposes a specific position to the corresponding one of the subsections 130*a*, 130*b*, 130*c* of the shoulder joint 130. When combined together, the motion given to these subsections 130*a*, 130*b*, 130*c* will create the desired wing motions and the various sub-motions.

In the illustrated example, the reciprocately-movable axle 266 located inside the main frame 110 is driven by the motor 150 through the third lateral axle 220 to which a fourth timing belt 270 is also connected. This fourth timing belt 270 extends between a pair of pulleys, one of which is in a torque-transmitting engagement with the third lateral axle 220. The other pulley is in a torque-transmitting engagement with a fourth lateral axle 272 to which a fourth lever arm 274 is connected. The fourth lever arm 274 is operatively connected to a fifth lever arm 280, itself connected to a fifth lateral axle 282 through a fourth push-pull rod 284. However, the top end of the fourth push-pull rod 284 is operatively connected to a corresponding side pin at a radius that is smaller than that of the bottom end of the fourth push-pull rod 284. Thus, for each rotation of the fourth lever arm 274, there is only a back and forth motion of the fifth lever arm 280. This creates the alternating pivoting motion. It is transmitted to the reciprocately-movable axle 266 (FIG. 3) using a fifth timing belt 286 engaged around a corresponding pair of pulleys.

The illustrated linkage arrangement further includes a triple push-pull rod subassembly 230 provided on each wing structure 122. The subassembly 230 is designed to control the spatial orientation of the corresponding second torsion-responsive tube 136 and that of the corresponding third torsion-responsive tube 140 using only the relative position of the first torsion-responsive tube 132 with reference to the shoulder joint 130, more particularly to the second shoulder joint subsection 130*b*. Thus, no additional actuators are required.

The subassembly 230 includes a first push-pull rod 232. The first push-pull rod 232 has a proximal end that is operatively connected inside the upper side of the second shoulder joint subsection 130*b* using a corresponding side pin. The proximal end of a substantially horizontally-disposed lever arm 234 is pivotally connected to a bracket 236 (FIGS. 11 and 12). The bracket 236 is itself rigidly connected to the proximal end member 134*a* of the corresponding elbow joint 134. The substantially horizontally-disposed lever arm 234 controls the spatial orientation of the corresponding third torsion-responsive tube 140 in three dimensions, namely the up/down orientation and the front/rear orientation, using two other push-pull rods, namely a second push-pull rod 240 and a third push-pull rod 242. The proximal end of the second push-pull rod 240 is the rigidly connected to the distal end of the lever arm 234. The distal end of the second push-pull rod 240 is operatively connected to a location at the rear side of the distal end member 138*b* (FIG. 13) of the corresponding wrist joint 138 using a corresponding side pin. The proximal end of the third push-pull rod 242 is the operatively connected to a location under the distal end of the lever arm 234 using a corresponding side pin. The distal end of the third push-pull rod 242 is operatively connected to a location under the mesial end member 138*c* of the corresponding wrist joint 138. The third push-pull rod 242 also supports most of the weight of the corresponding third torsion-responsive tube 140 since the illustrated wrist joint 138 is a universal joint.

As can be seen, the spatial positioning of the third torsion-responsive tube 140 is imposed by the subassembly 230. The corresponding second torsion-responsive tube 136 is simply following the motion.

During flight, the motion of the wings 120 will be repeated continuously. This motion, however, is far more complex than simply an up and down movement. Each part of the wing structure 122 inside each wing 120 will move so as to create an optimized motion.

FIGS. 15A to 15H are side views of the left wing structure 122 of the wing flapping mechanism 100 during an example of a wing flapping cycle. The eight successive positions depicted in this example are referred to as positions A to H. The corresponding views for the right wing are substantially mirror images thereof.

As best shown in FIG. 15A to 15H, the alternating pivoting motion provided by the wing flapping mechanism 100 increases thrust but also contributes indirectly in optimizing lift and drag during the wing flapping cycle. Progressive torsion, from wing tip to wing base, increases lift and thrust while limiting drag of the wing profile (depending of the airfoil section 114 on the lateral axis 114), this being proportional to the amplitude of the flapping, longitudinal and folding motions.

The wing shoulder backward pivoting around the lateral axis 114 (Y-axis) is useful to reduce drag during upstroke at slow longitudinal speeds.

Figure 15A:
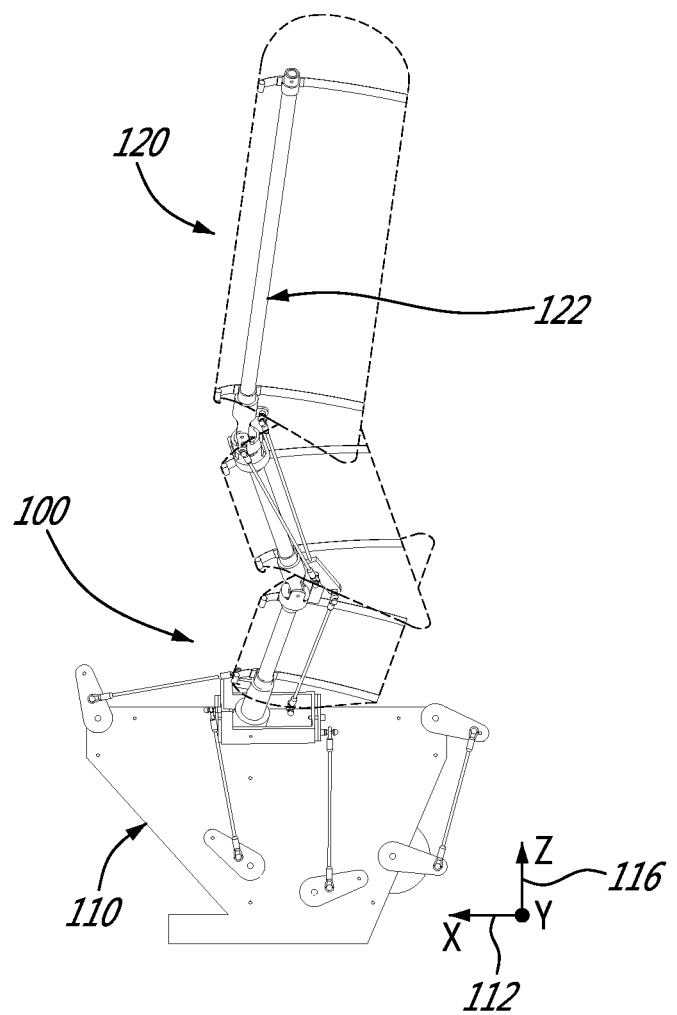
FIGS. 15A to 15H are side views of the left wing structure of the wing flapping mechanism shown in FIG. 3 during an example of a complete wing flapping cycle.
Figure 15B:
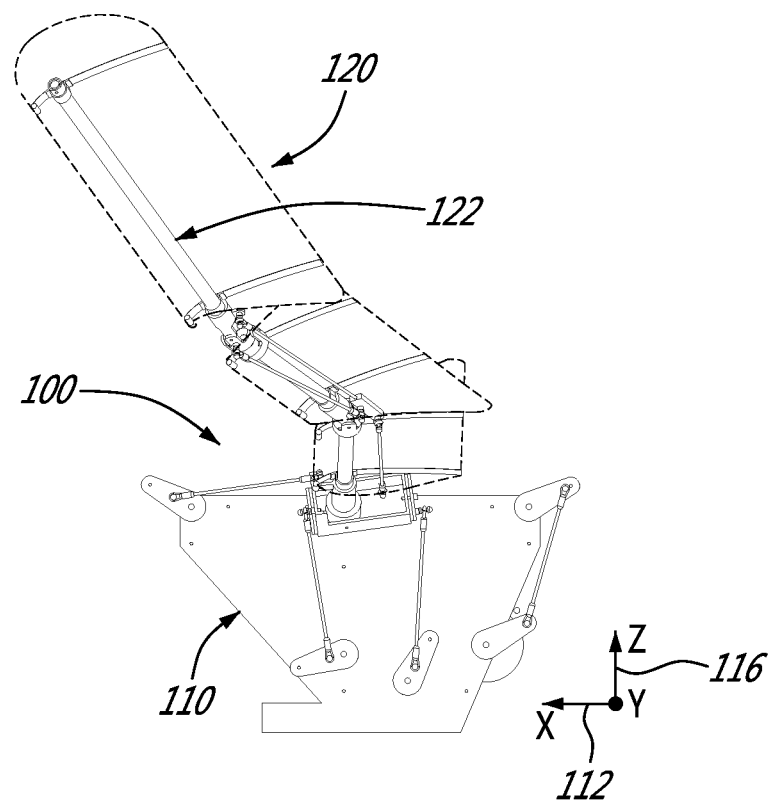
Figure 15C:
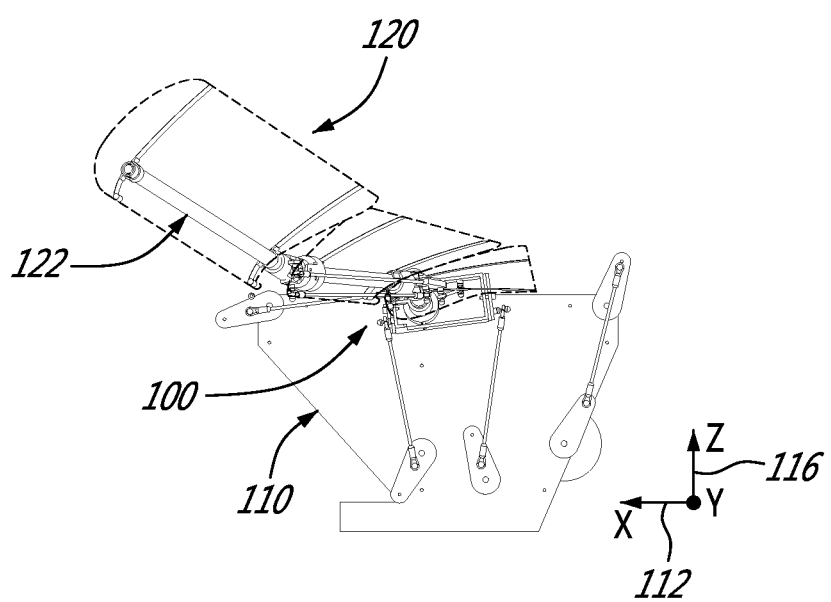
Figure 15D:
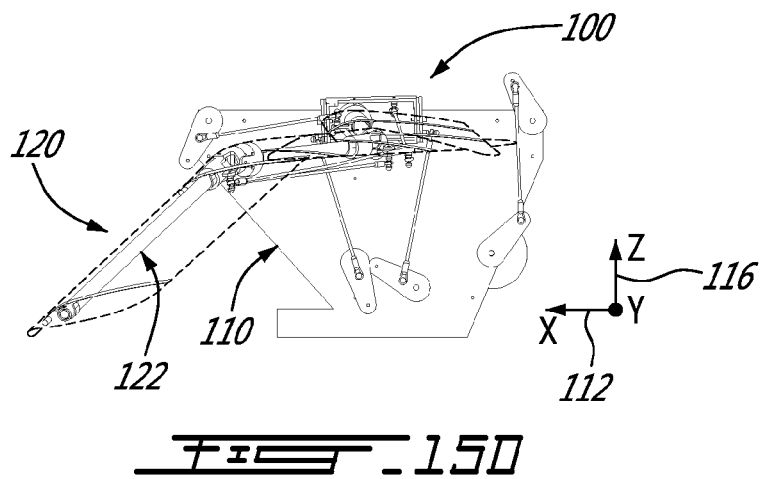
Figure 15E:
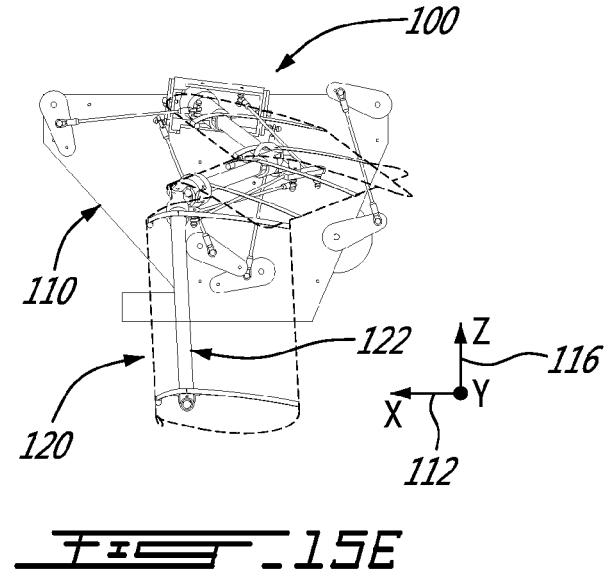
Figure 15F:
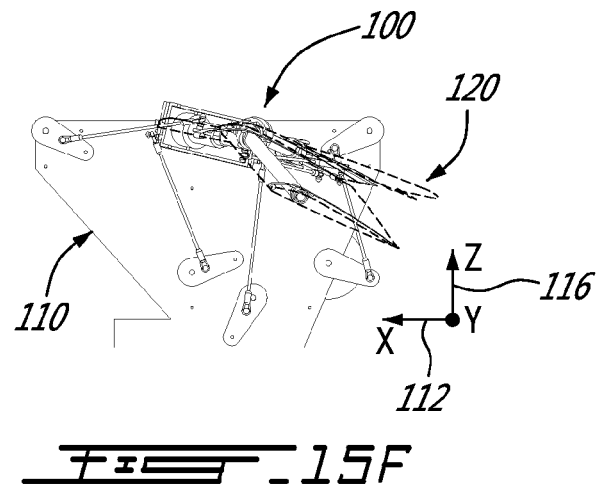
Figure 15G:
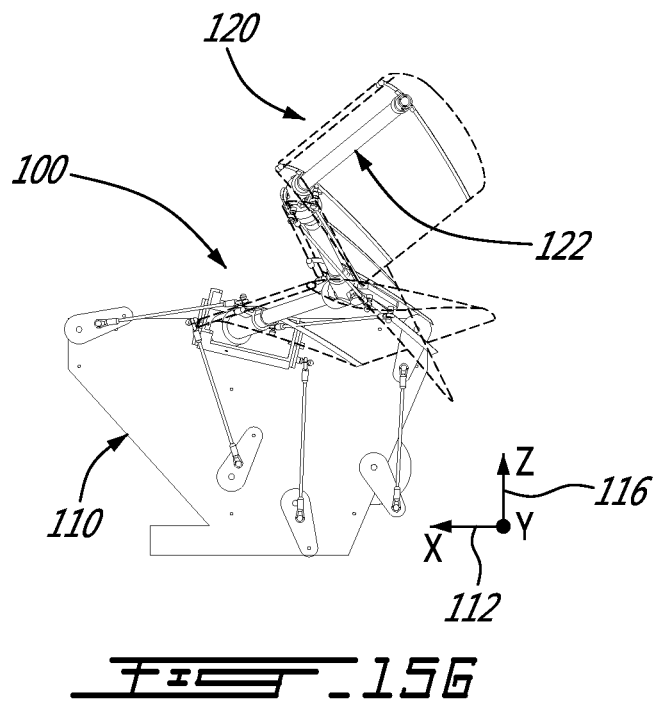
Figure 15H:
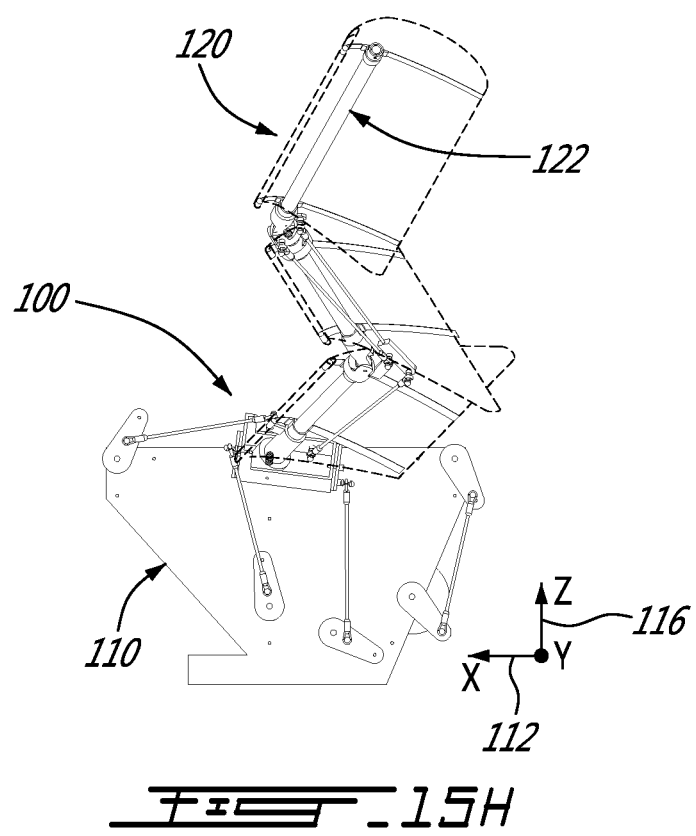
Figure 16A:
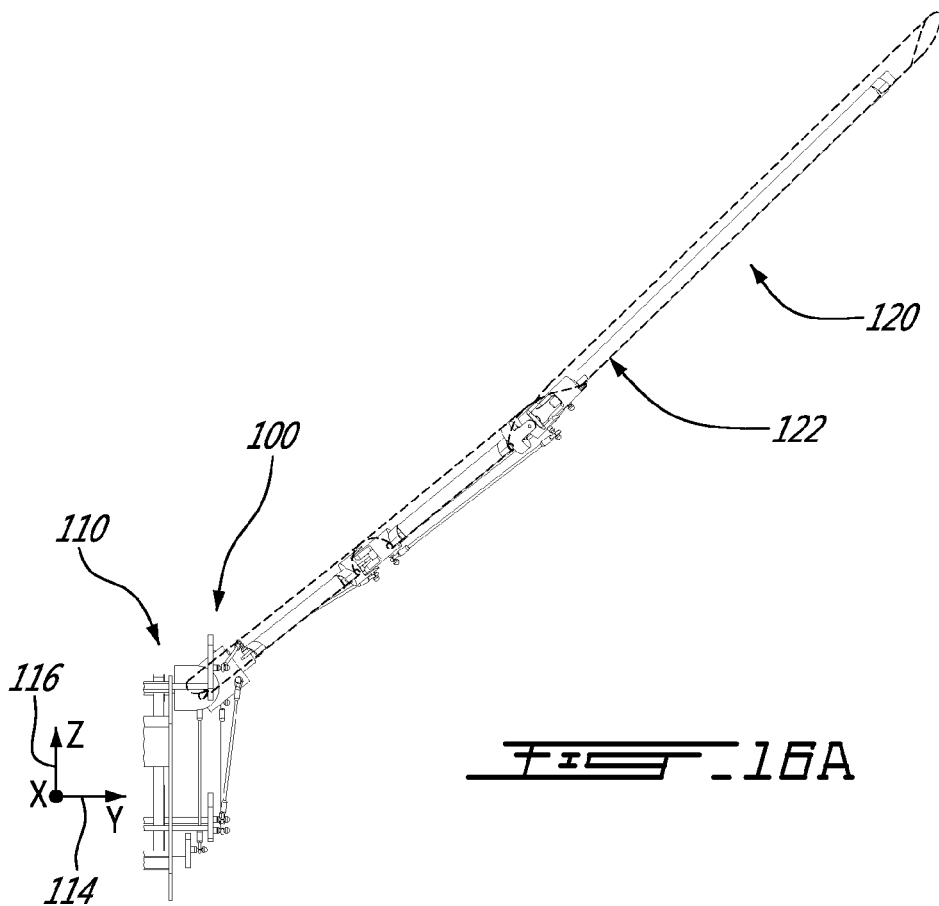
FIGS. 16A to 16H are front views of the left wing structure of the wing flapping mechanism shown in FIG. 3, each view A to H corresponding in position to what is shown in FIGS. 15A to 15H, respectively.
Figure 16B:
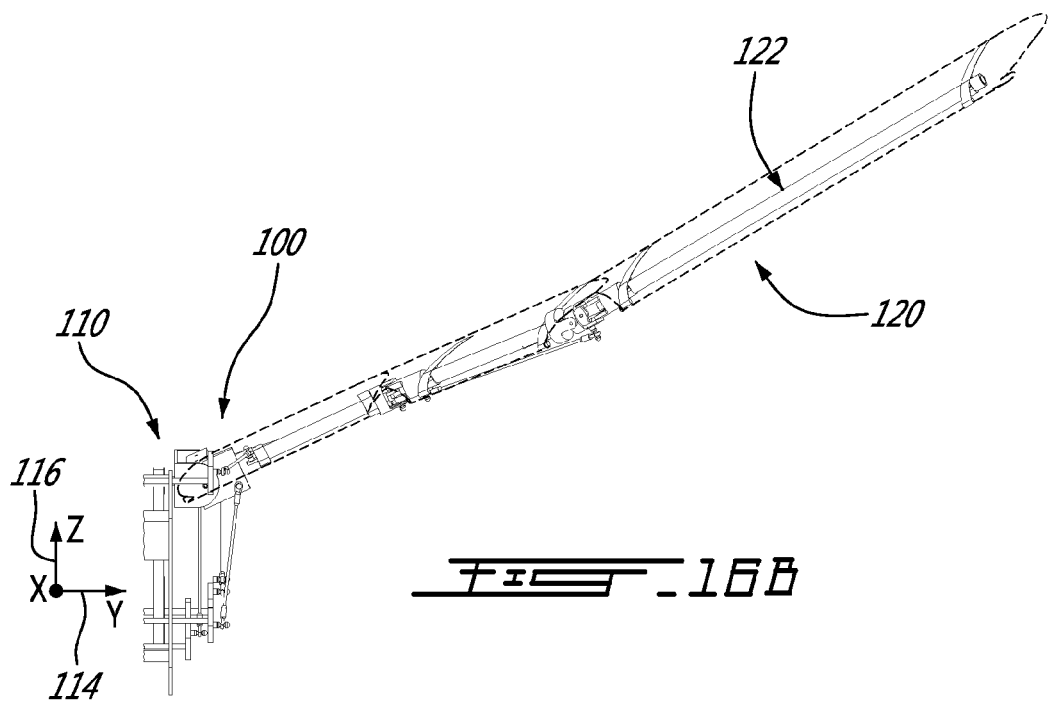
Figure 16C:
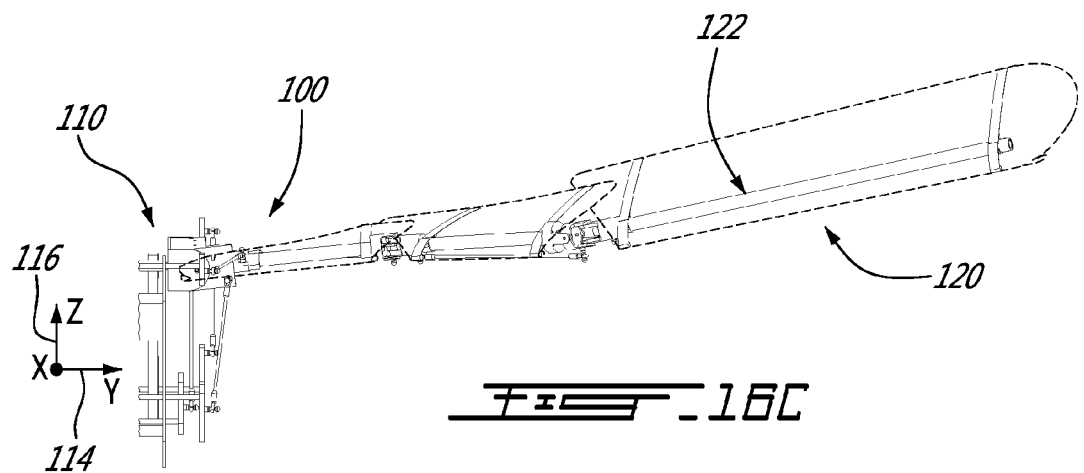
Figure 16D:
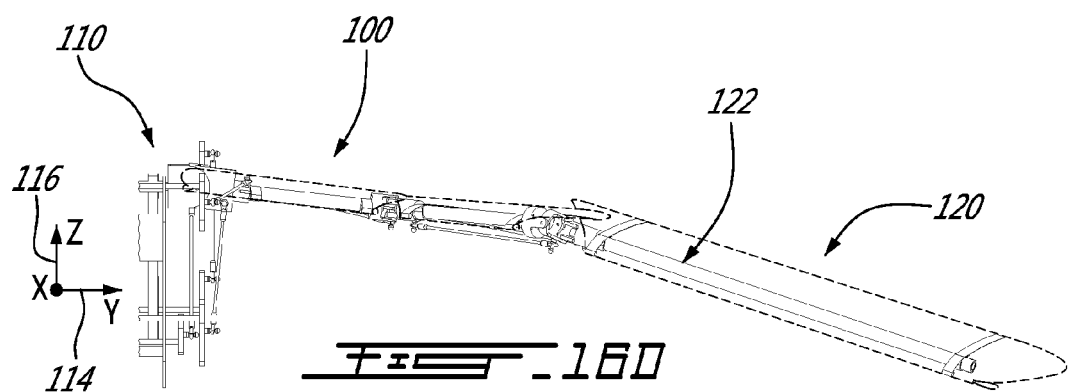
Figure 16E:
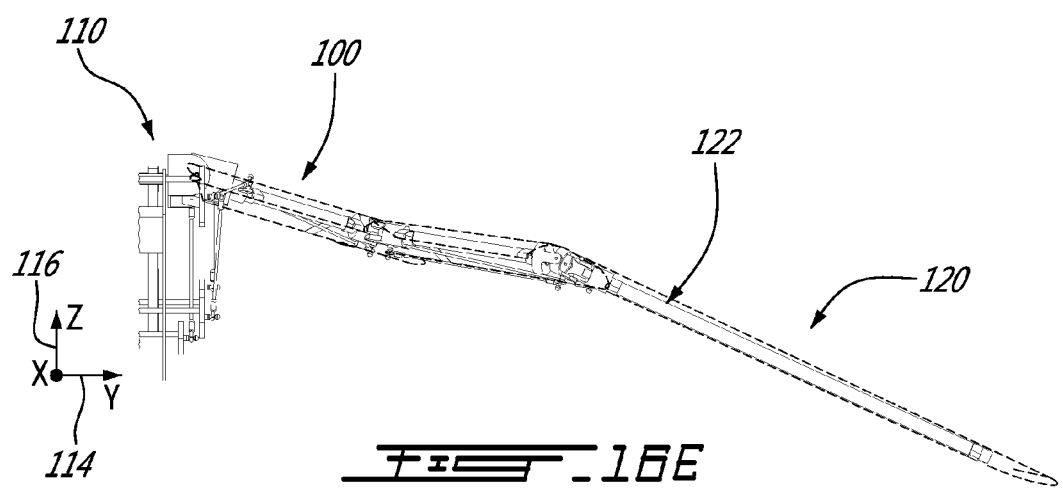
Figure 16F:
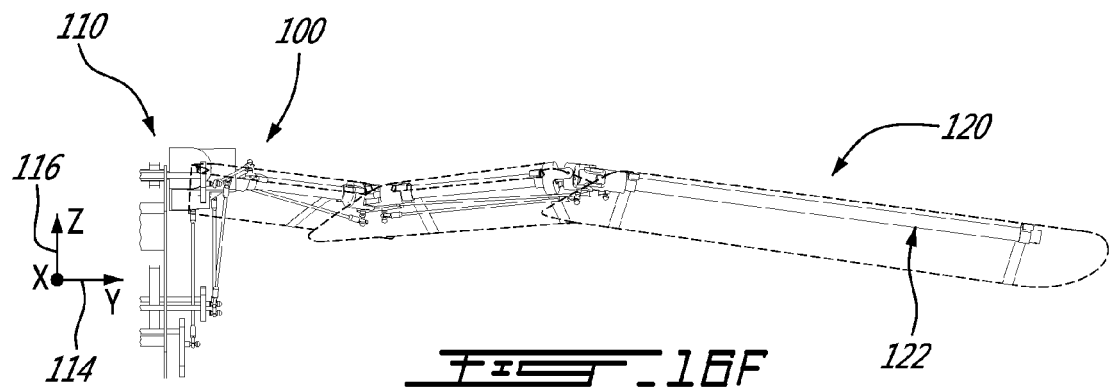
Figure 16G:
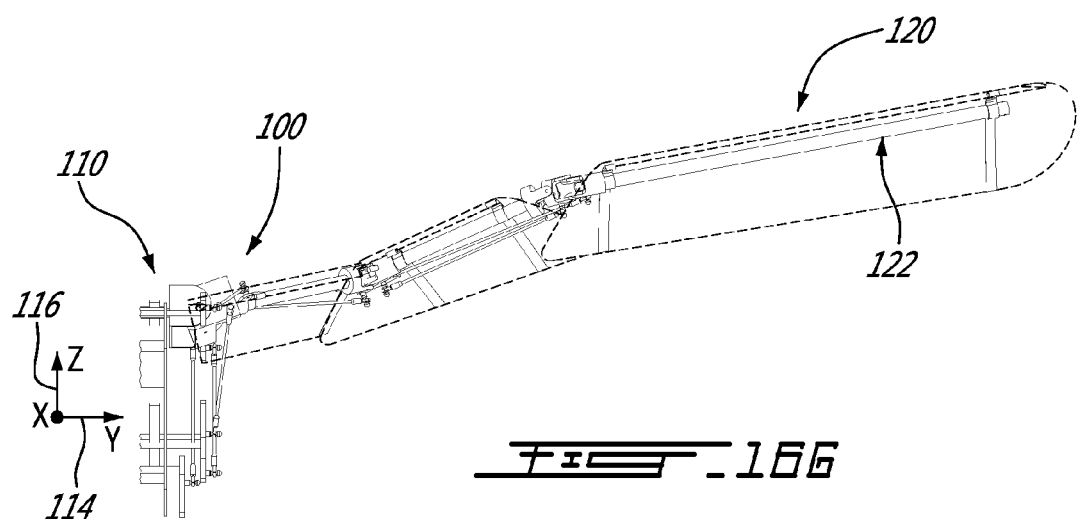
Figure 16H:
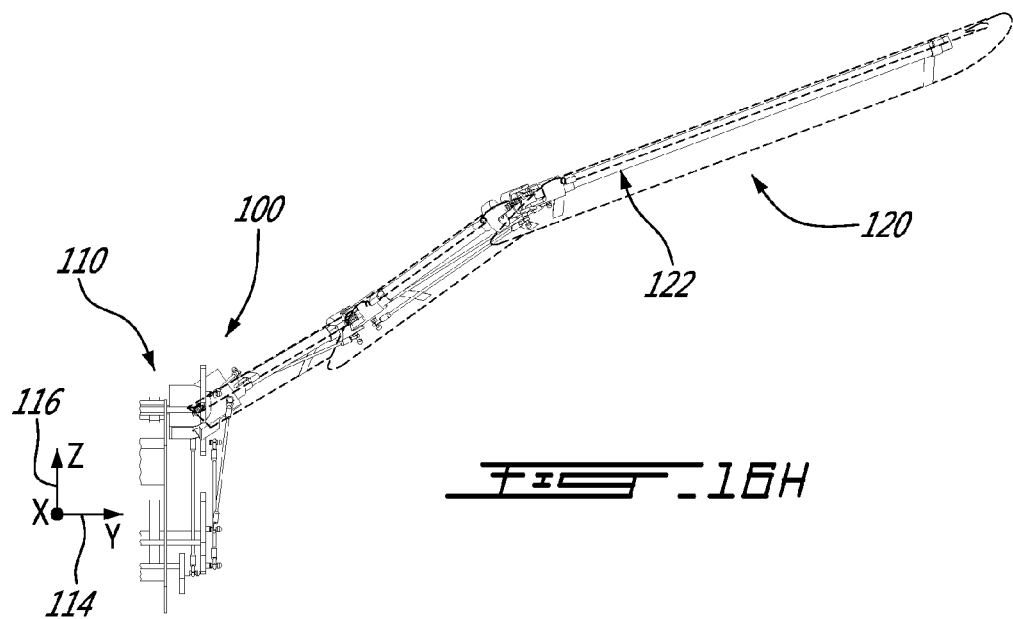
Figure 17A:
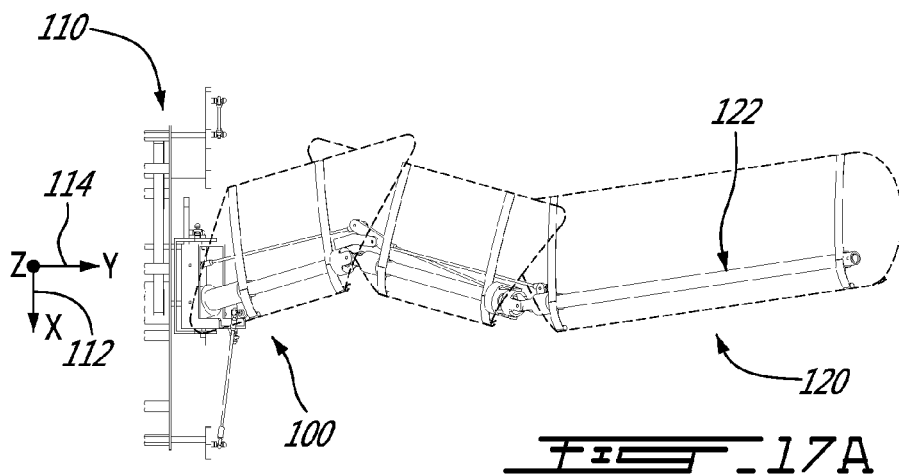
FIGS. 17A to 17H are top views of the left wing structure of the wing flapping mechanism shown in FIG. 3, each view A to H corresponding in position to what is shown in FIGS. 15A to 15H, respectively.
Figure 17B:
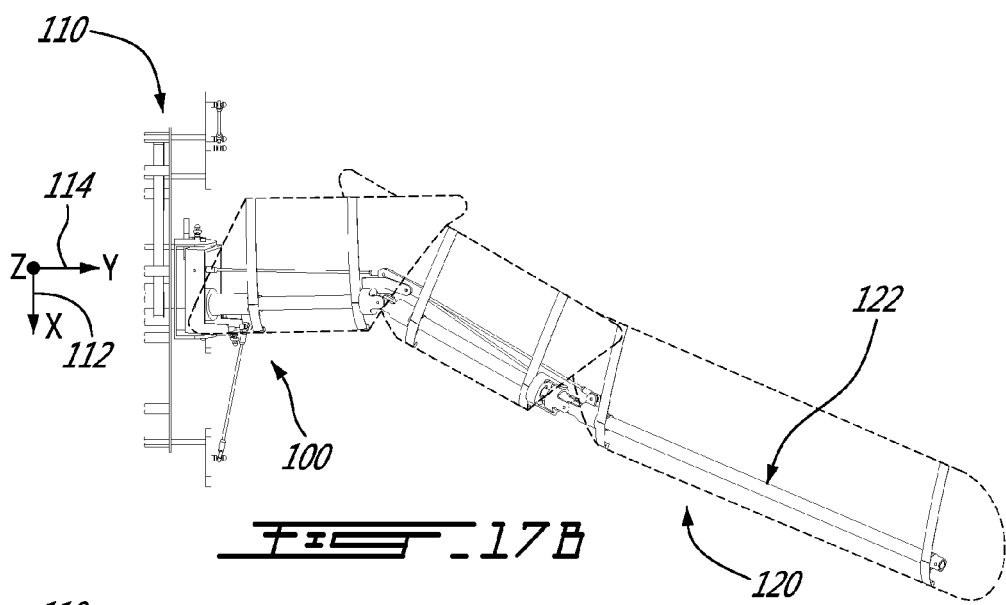
Figure 17C:
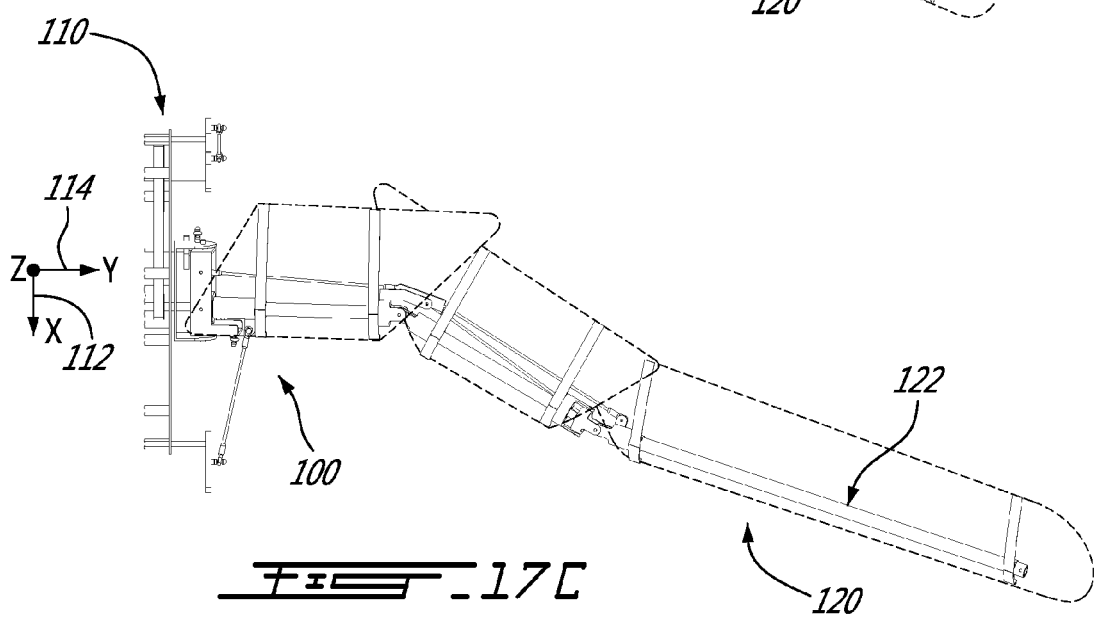
Figure 17D:
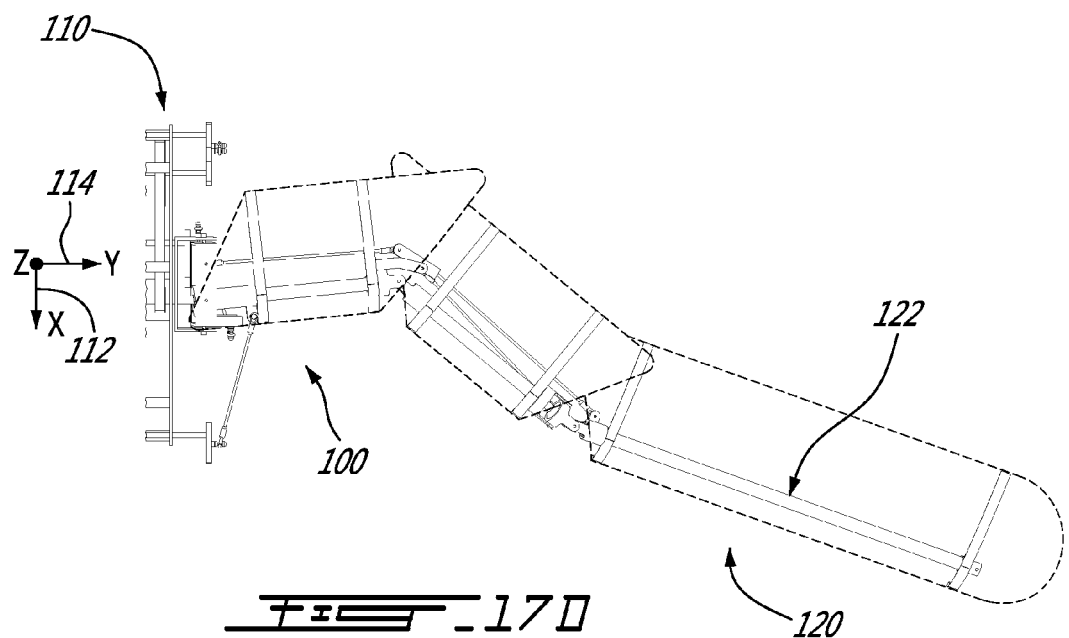
Figure 17E:
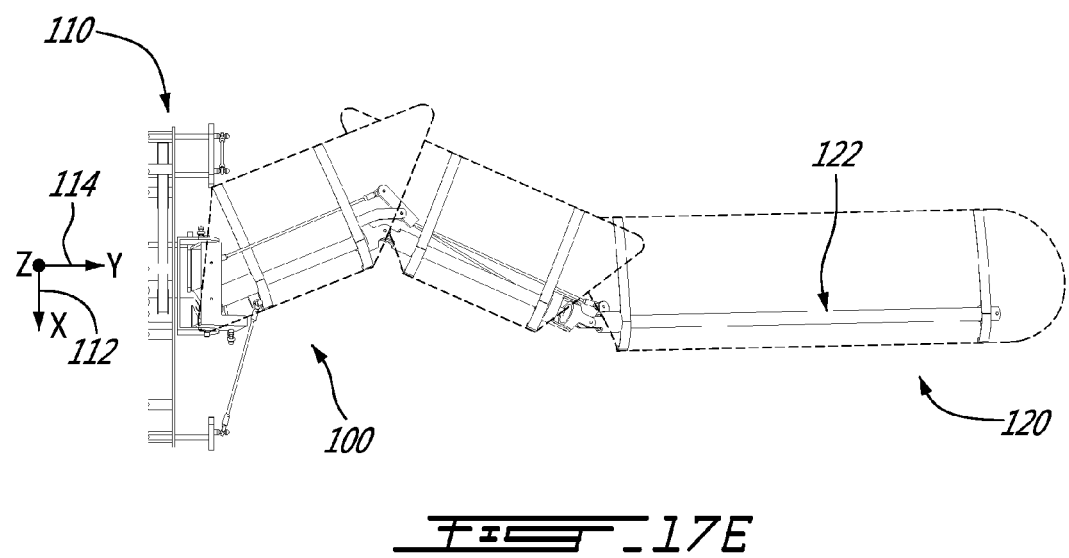
Figure 17F:
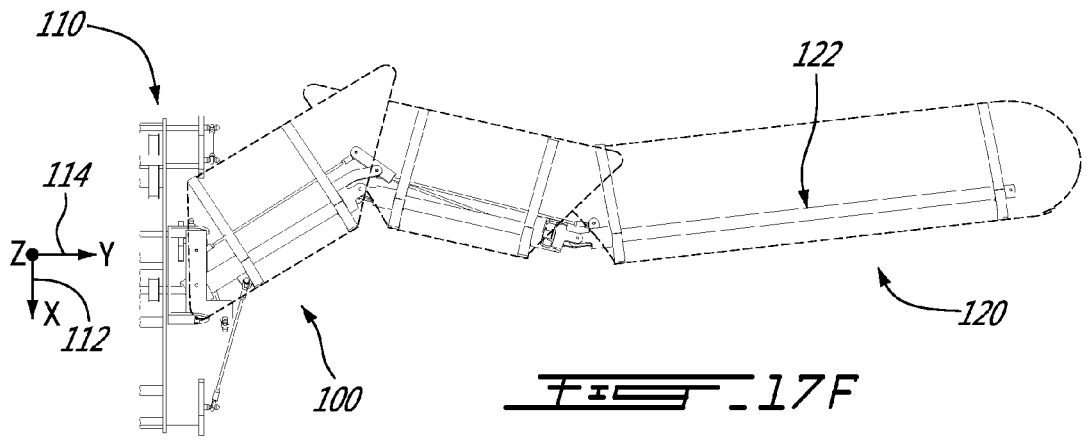
Figure 17G:
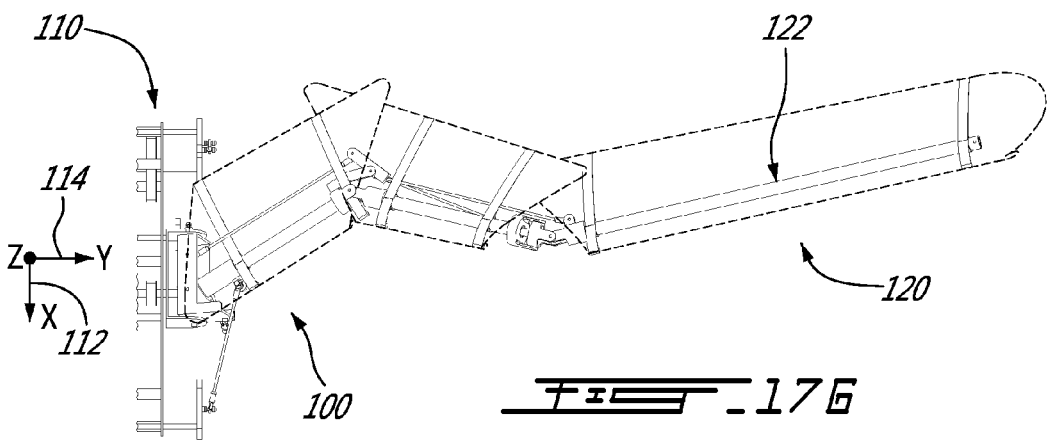
Figure 17H:
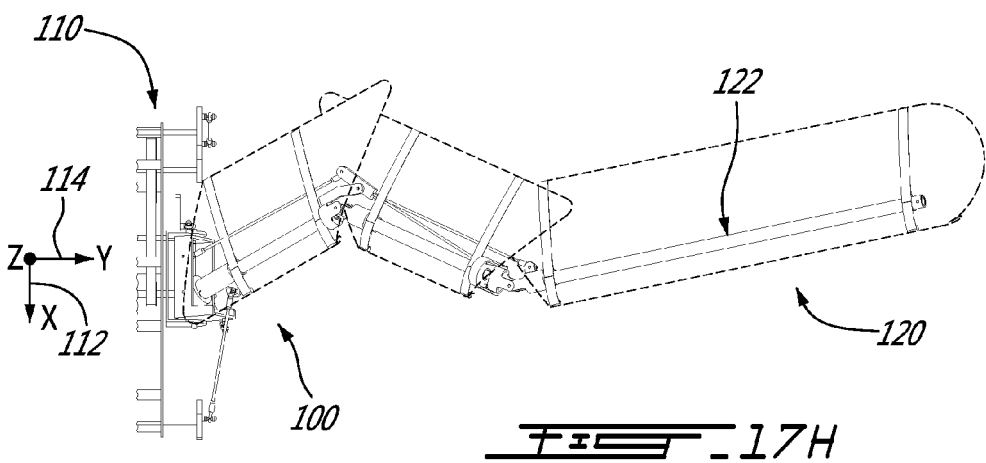

FIGS. 16A to 16H and FIGS. 17A to 17H are front and top views of the left wing structure 122 of the wing flapping mechanism 100. Each view A to H corresponds in position to what is shown in FIGS. 15A to 15H, respectively. Thus, for instance, FIGS. 15A, 16A and 17A show the left wing structure 122 in the same position, namely position A. Only the viewpoint is changed. The same is also true for the other figures of these groups.

As best shown in FIGS. 16A to 16H, the wing flapping mechanism 100 includes a wing flapping sub-motion that once combined with the wing longitudinal/deployment-folding sub-motions, contributes in amplifying the relative wing tip angular stroke (compared to the inner airfoil section 144) as well as its speed, thus increasing lift, thrust and the overall speed.

As best shown in FIGS. 17A to 17H, the wing tip longitudinal sub-motion combined with the deployment-folding sub-motion contributes in increasing or decreasing the longitudinal wing tip speed so as to optimize lift during upstroke and increase lift during down stroke. It also contributes in reducing drag during the upstroke, in increasing thrust during down stroke by increasing longitudinal wing tip speed, and in keeping the center of gravity substantially in alignment with the lift center of the wing flapping mechanism 100 in a way to reduce the pitch moment during flapping.

Figure 18:
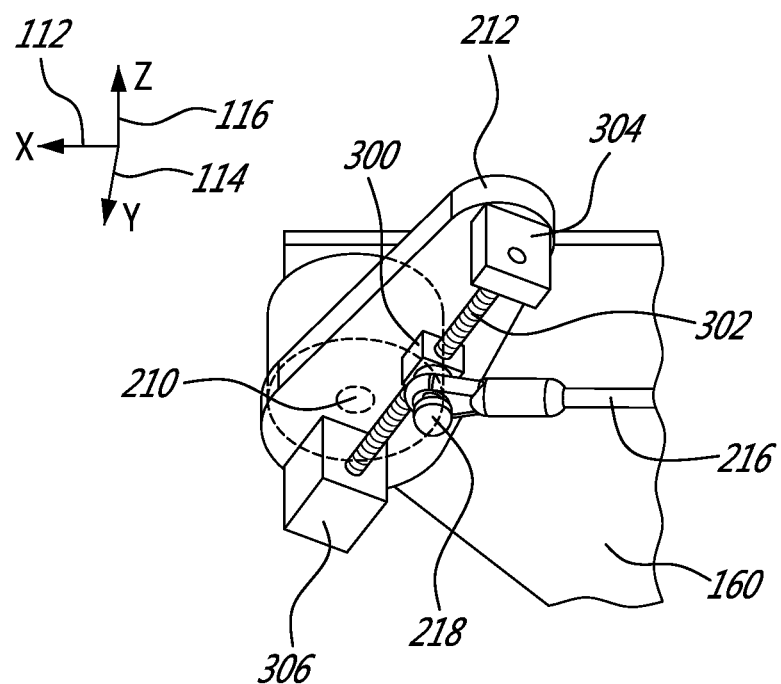
FIG. 18 is an isometric and semi-schematic view illustrating an example of an arrangement for repositioning the end of a push-pull rod on a corresponding lever arm.

FIG. 18 is an isometric and semi-schematic view illustrating an example of an arrangement for repositioning the end of a push-pull rod on a corresponding lever arm. In this example, the end of the second push-pull rod 216 is connected to the lever arm 212 using a side pin 218 that is mounted on a follower 300. The follower 300 is itself mounted on a rotatable screw 302 that extends radially with reference to the lever arm 212. The end of the screw 302 is pivotally connected to a bracket 304 and the inner end of the screw 302 can be driven by an electric servomotor 306 when needed. The servomotor 306 can rotate the screw 302 on itself to change the position of the follower 300 along the length of the screw 302. The servomotor 306 can receive electricity using brushes (not shown) mounted on the axle 210. The same arrangement can be provided on some or all the other lever arms. This way, one can vary the amplitude of one or more of the five sub-motions without the need of stopping the rotation of the motor 150 to make adjustments. Other configurations and arrangements are possible as well.

Depending on the flight conditions, one can change the amplitude of each part of the motion and also vary the amplitude of the torsional alternating motion. The amplitude is of about 120° in the figures but other values are possible as well.

FIGS. 19 and 20 are top views of the left wing 120 of the mechanical bird 102. These figures illustrate an example of an optional wing extension 310 that can be very useful for low speed flights. This wing extension 310 is designed to progressively increase the wing surface as the wing 120 is fully extending sideways, more particularly when the second torsion-responsive tube 136 and the third torsion-responsive tube 140 moves to be substantially in alignment with one another. This is shown for instance in FIGS. 15D, 16D and 17D. The wing surface is then decreased when the wing 120 is retracted since the wing extension 310 is back inside the wing 120. The wing extension 310 is pivoted in or out of its stowed position in function of the relative angle between the torsion-responsive tubes 136, 140. As can be seen, the wing extension 310 is pivotally attached to the third torsion-responsive tube 140 at 312. It includes a first lever arm 314 extending inwards. The inner end of the first lever arm 314 is pivotally attached to a second lever arm 316, itself pivotally attached to an additional portion 318 of the second push-pull rod 240 that extends beyond the distal end member 138*b* of the wrist joint 138. Variants are possible as well.

As can be appreciated, the complex motion of the wings 120 can be made by using a single motor 150 and even if no additional actuators are used at the wing tips to generate an alternating pivoting motion.

The present detailed description and the appended figures are meant to be exemplary only, and a skilled person will recognize that variants can be made in light of a review of the present disclosure without departing from the proposed concept. For instance, the materials, the shape and many other characteristics specified in the detailed description are only examples.

In an alternative implementation of the proposed concept, one can block the rotation of the first torsion-inducing tube 252 at its proximal end, for instance by blocking the rotation of the axle 266 inside the main frame 110 or by blocking of the rotation of the first torsion-inducing tube 252 within the socket member 130*c*' of the third shoulder joint subsection 130*c*, and include a servomotor, for instance an electric servomotor, at the wing tip of each wing 120 instead of the corresponding locking pins 258. Each servomotor would be provided between the distal end of the corresponding third torsion-inducing tube 256 and the distal end of the corresponding third torsion-responsive tube 140. This way, the torsion-inducing tubes 252, 254, 256 will hold the corresponding servomotor, i.e. preventing it from pivoting, while it applies torque at the distal end of the third torsion-responsive tube 140. The torque transmitted at the distal end will create the twisting effect towards the proximal end of the third torsion-responsive tube 140. Then, at the proximal end of the third torsion-responsive tube 140, torque will also be transmitted to the distal end of the second torsion-responsive tube 136 since the wrist joint 138 is designed to transmit torque from its distal end to its proximal end. The same also applies for the elbow joint 134 since it is designed to transmit torque from its distal end to its proximal end as well. Thus, the twisting effect can be transmitted through the whole wing structure 122 all the way towards the shoulder joint 130, although this twisting effect will decrease towards the center. The elasticity of the materials can be chosen according to the desired effect.

The figures are only showing one possible example of an implementation. The figures depicting the example of a complete wing flapping cycle are only presenting one among many possible settings.

Overall, all possible adjustments will provide designers with ways to tailor and optimize each implementation based on the specific needs.

Other variants are also possible as well.

LIST OF REFERENCE NUMERALS 100 wing flapping mechanism
102 mechanical bird/flying machine
104 head section (of the mechanical bird)
106 main body
108 tail section (of the mechanical bird)
110 main frame (of the wing flapping mechanism)
112 longitudinal axis (X)
114 lateral axis (Y)
116 vertical axis (Z)
117 horizontal X-Y plane
118 transversal Y-Z plane
120 wing
122 wing structure
130 shoulder joint
130a first shoulder joint subsection (of shoulder joint 130)
130a' main plate member (of first shoulder joint subsection 130a)
130a" flanged members (of first shoulder joint subsection 130a)
130b second shoulder joint subsection (of shoulder joint 130)
130c third shoulder joint subsection (of shoulder joint 130)
130c' socket member (of third shoulder joint subsection 130c)
130d first pivot axis (of shoulder joint 130)
130e second pivot axis (of shoulder joint 130)
130f third pivot axis (of shoulder joint 130)
132 first torsion-responsive tube
134 elbow joint
134a elbow proximal end member (of elbow joint 134)
134b elbow distal end member (of elbow joint 134)
134c elbow pivot axis (of elbow joint 134)
136 second torsion-responsive tube
138 wrist joint
138a proximal end member (of wrist joint 138)
138b distal end member (of wrist joint 138)
138c mesial end member (of wrist joint 138)
138d first pivot axis (of wrist joint 138)
138e second pivot axis (of wrist joint 138)
140 third torsion-responsive tube
142 rib
144 airfoil section
144' first structural extrados airfoil section (in FIG. 10C)
144" second structural extrados airfoil section (in FIG. 10C)
144'" third structural extrados airfoil section (in FIG. 10C)
150 motor
152 battery
154 output shaft
160 plate
162 spacer bar
170 speed-reduction transmission
200 first lateral axle
202 first lever arm
204 first timing belt
206 first push-pull rod
208 side pin
210 second lateral axle
212 second lever arm
214 second timing belt
216 second push-pull rod
218 side pin
220 third lateral axle
222 third lever arm
224 third timing belt
226 third push-pull rod
228 side pin
230 triple push-pull rod subassembly
232 first push-pull rod
234 lever arm
236 bracket
240 second push-pull rod
242 third push-pull rod
252 first torsion-inducing tube
254 second torsion-inducing tube
256 third torsion-inducing tube
258 locking pin
260 first flexible torque-transmitting member
262 second flexible torque-transmitting member
264 third flexible torque-transmitting member
266 reciprocately-movable axle
270 fourth timing belt
272 fourth lateral axle
274 fourth lever arm
280 fifth lever arm
282 fifth lateral axle
284 fourth push-pull rod
286 fifth timing belt
300 follower
302 screw
304 bracket
306 servomotor
310 wing extension
312 pivot
314 first lever arm
316 second lever arm
318 additional portion (of second push-pull rod 240)

What is claimed is:

1. A wing flapping mechanism (100) including:
a main frame (110) extending along a longitudinal axis (112);
a pair of opposite wing structures (122) laterally projecting from the main frame (110), each wing structure (122) including:
a triaxial shoulder joint (130) having a proximal end and a distal end, the proximal end of the shoulder joint (130) being pivotally connected to a respective side of the main frame (110);
a first torsion-responsive tube (132, 144') having a proximal end and a distal end, the proximal end of the first torsion-responsive tube (132, 144') being rigidly connected to the distal end of the shoulder joint (130);
an uniaxial elbow joint (134) having a proximal end and a distal end, the proximal end of the elbow joint (134) being rigidly connected to the distal end of the first torsion-responsive tube (132, 144');
a second torsion-responsive tube (136, 144") having a proximal end and a distal end, the proximal end of the second torsion-responsive tube (136, 144") being rigidly connected to the distal end of the elbow joint (134);
a biaxial wrist joint (138) having a proximal end and a distal end, the proximal end of the wrist joint (138)

being rigidly connected to the distal end of the second torsion-responsive tube (136, 144"); and a third torsion-responsive tube (140, 144''') having a proximal end and a distal end, the proximal end of the third torsion-responsive tube (140, 144''') being rigidly connected to the distal end of the wrist joint (138); and a linkage arrangement to convert rotation of a motor (150) into a three-dimensional cyclic wing motion of each of the wings (120), the linkage arrangement including torque-transmitting couplings extending from inside the main frame (110) into the wing structures (122) to transmit an alternating pivoting motion, created as a result of the rotation of the motor (150), to the distal end of a corresponding one of the third torsion-responsive tubes (140, 144'''), each torque-transmitting coupling extending inside the shoulder joint (130), the first torsion-responsive tube (132, 144'), the elbow joint (134), the second torsion-responsive tube (136, 144"), the wrist joint (138) and the third torsion-responsive tube (140, 144''') of the corresponding wing structure (122).

2. The wing flapping mechanism (100) as defined in claim 1, wherein each of the torque-transmitting couplings includes:

three juxtaposed torsion-inducing tubes (252, 254, 256), a first (252) of the torsion-inducing tubes being disposed inside the corresponding first torsion-responsive tube (132, 144'), a second (254) of the torsion-inducing tubes being disposed inside the corresponding second torsion-responsive tube (134, 144") and a third (256) of the torsion-inducing tubes being disposed inside the third torsion-responsive tube (140, 144'''); and three flexible torque-transmitting members (260, 262, 264), a first (260) of the flexible torque-transmitting members being coaxially disposed inside the corresponding shoulder joint (130) and coupling a reciprocately-movable axle (266) located inside the main frame (110) to the corresponding first torsion-inducing tube (252), a second (262) of the flexible torque-transmitting members being coaxially disposed inside the corresponding elbow joint (134) and coupling the corresponding first and second torsion-inducing tubes (252, 254), and a third (264) of the flexible torque-transmitting members being coaxially disposed inside the corresponding wrist joint (138) and coupling the corresponding second and third torsion-inducing tubes (254, 256).

3. The wing flapping mechanism (100) as defined in claim 2, wherein each flexible torque-transmitting member (260, 262, 264) is a coiled spring and/or an elastomeric part.

4. The wing flapping mechanism (100) as defined in claim 1, wherein the first torsion-responsive tube (132, 144'), the second torsion-responsive tube (134, 144") and the third torsion-responsive tube (140, 144''') are flexible in torsion, the alternating pivoting motion at the distal end of the third torsion-responsive tubes (140, 144''') transmitting a torsion bias in the corresponding wing (120) towards the proximal end of the corresponding first torsion-responsive tube (132, 144').

5. The wing flapping mechanism (100) as defined in claim 1, wherein each shoulder joint (130) includes three juxtaposed shoulder joint subsections (130a, 130b, 130c) pivotally connected to one another, a first (130a) of the shoulder joint subsections defining the proximal end of the shoulder joint (130) and being pivotally connected to the corresponding side of the main frame (110) around a first pivot axis (130d) extending substantially parallel to the lateral axis (114), a second one (130b) of the shoulder joint subsections being pivotally connected to the corresponding first shoulder joint subsection (130a) around a second pivot axis (130e) extending substantially parallel to the longitudinal axis (112), a third (130c) of the shoulder joint defining the distal end of the shoulder joint (130) and being pivotally connected to the corresponding second shoulder joint subsection (130b) around a third pivot axis (130f) extending substantially orthogonal with reference to both the first pivot axis (130d) and the second pivot axis (130e).

6. The wing flapping mechanism (100) as defined in claim 5, wherein the first, second and third pivot axes (130d, 130e, 130f) of each shoulder joint subsection (130a, 130b, 130c) are substantially intersecting one another inside the corresponding shoulder joint (130).

7. The wing flapping mechanism (100) as defined in claim 5, wherein at least one among the first, second and third torsion-responsive tubes (132, 136, 140) has a hollow cylindrical body with an inner circular cross section in which a corresponding one among the torsion-inducing tubes (252, 254, 256) is coaxially disposed.

8. The wing flapping mechanism (100) as defined in claim 5, wherein at least one among the first, second and third torsion-responsive tubes is formed at least partially by a corresponding structural extrados airfoil section and/or all of the torsion-responsive tubes are formed by corresponding first, second and third structural extrados airfoil sections (144', 144", 144'''), respectively.

9. The wing flapping mechanism (100) as defined in claim 1, wherein the motor (150) is located inside the main frame (110) and/or the motor (150) is an electric motor.

10. The wing flapping mechanism (100) as defined in claim 9, wherein the motor (150) is a single motor (150) driving the linkage arrangement of both wing structures (122).

11. A wing flapping mechanism (100) including:

a motor (150), for instance an electric motor, having a unidirectional rotatable output shaft;

three spaced-apart rotatable axles (200, 210, 220) that are mechanically connected to the unidirectional rotatable output shaft, the rotatable axles (200, 210, 220) having a same rotation speed and direction during operation of the motor (150), each full rotation of the rotatable axles (200, 210, 220) corresponding to a wing flapping cycle; and a reciprocately-movable axle (266) that is mechanically connected to the unidirectional rotatable output shaft, the reciprocately-movable axle (266) having an alternating pivoting motion synchronized with the rotation of the rotatable axles (200, 210, 220) and being repeated at each wing flapping cycle.

12. The wing flapping mechanism (100) as defined in claim 11, wherein the reciprocately-movable axle (266) is mechanically connected to the unidirectional rotatable output shaft through an arrangement including a fourth rotatable axle (272) and a push-pull rod (284) extending between the fourth rotatable axle (272) and the reciprocately-movable axle (266), the fourth rotatable axle (272) having the same rotation speed and direction during operation of the motor (150) than that of the other rotatable axles (200, 210, 220).

13. A method of transmitting an alternating pivoting motion to a tip of a wing (120) of a wing flapping flying machine (102) using a set of juxtaposed and interconnected torsion-inducing tubes (252, 254, 256) coaxially disposed inside a corresponding set of juxtaposed and interconnected torsion-responsive tubes (132, 136, 140, 144', 144", 144'''), the alternating pivoting motion being transmitted between the torsion-inducing tubes (252, 254, 256) regardless of spatial orientation of the torsion-inducing tubes (252, 254, 256) and of the torsion-responsive tubes (132, 136, 140, 144', 144", 144'").

14. A method of generating a wing flapping motion using a wing flapping mechanism (100) provided on a flying machine (102) having two opposite wings (120), the wing flapping mechanism (100) being capable of creating a sustained flight of the flying machine (102) using mechanical motor power, the wing flapping mechanism (100) driving each wing (120) into a 3D cyclic motion that is a combination of five sub-motions imposed to three juxtaposed and non-collinearly disposed wing segments.

15. The method as defined in claim 14, wherein at least a portion of the wing flapping mechanism (100) is provided between the wings (120) of the flying machine (102).

16. The method as defined in claim 15, wherein the mechanical motor power is provided by at least one on-board motor (150) and/or the mechanical motor power is provided by a single on-board motor (150) driving both wings (120).

17. The method as defined in claim 14, wherein one of the sub-motions includes an alternating pivoting motion of a tip of each wing (120), the alternating pivoting motion being applied at the tip of each wing (120) for twisting each wing (120) towards the center of the flying machine (102).

18. The method as defined in claim 14, wherein the method includes varying at least some of the sub-motions in amplitude to modify flight parameters of the flying machine (102).

19. The method as defined in claim 14, wherein the five sub-motions include a flapping sub-motion, a forward-rearward sub-motion, a folding-deployment sub-motion, a pitch sub-motion and a progressive wing twisting sub-motion, whereby:

the flapping sub-motion is created when a second shoulder joint subsection (130*b*) pivots around a longitudinal axis (112) (X-axis);

the forward-rearward sub-motion is created when a third shoulder joint subsection (130*c*) pivots around a vertical axis (116) (Z-axis);

the folding-deployment sub-motion is created when the wing segments fold or deploy on themselves along the lateral axis (114) (Y-axis), within a horizontal X-Y plane (117);

the pitch sub-motion is created when a first shoulder joint subsection (130*a*) pivots around the lateral axis (114) (Y-axis); and the progressive wing twisting sub-motion is created when the wing tip is pivoted around the lateral axis (114) (Y-axis), thereby transmitting an alternating pivoting motion through the wing structure (122).

20. A method of propelling a flying machine (102) using flapping wings (120) extending from a main frame (110), each wing (120) including three juxtaposed and non-collinearly disposed wing structure segments, the method including:

generating a cyclic three-dimensional flapping motion of each wing (120); and simultaneously generating a cyclic alternating pivoting sub-motion at a tip of each wing (120) regardless of a relative position of the corresponding wing structure segment.

21. The method as defined in claim 20, wherein generating the cyclic alternating pivoting motion includes transmitting a driving torque inside the corresponding wing structure segments and across joints (130, 134, 138) of each wing (120).

22. The method as defined in claim 20, wherein the cyclic alternating pivoting motion is transmitted from the tip of each wing (120) towards the main frame (110).

\* \* \* \* \*